US009231829B2

(12) United States Patent
Isobe

(10) Patent No.: US 9,231,829 B2
(45) Date of Patent: Jan. 5, 2016

(54) COMMUNICATION DEVICE

(71) Applicant: HITACHI, LTD., Tokyo (JP)

(72) Inventor: Takashi Isobe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 14/241,106

(22) PCT Filed: Oct. 26, 2012

(86) PCT No.: PCT/JP2012/077755
§ 371 (c)(1),
(2) Date: Feb. 26, 2014

(87) PCT Pub. No.: WO2013/125096
PCT Pub. Date: Aug. 29, 2013

(65) Prior Publication Data
US 2014/0355442 A1 Dec. 4, 2014

(30) Foreign Application Priority Data

Feb. 24, 2012 (JP) ................. 2012-038157

(51) Int. Cl.
H04L 12/24 (2006.01)
H04L 12/825 (2013.01)
H04L 29/06 (2006.01)
H04L 12/801 (2013.01)
H04L 12/70 (2013.01)

(52) U.S. Cl.
CPC ............ *H04L 41/0896* (2013.01); *H04L 47/00* (2013.01); *H04L 47/127* (2013.01); *H04L 47/193* (2013.01); *H04L 47/25* (2013.01); *H04L 69/16* (2013.01)

(58) Field of Classification Search
None
See application file for complete search history.

(56) References Cited

U.S. PATENT DOCUMENTS

2007/0223379 A1 9/2007 Sivakumar et al.
2009/0073975 A1 3/2009 Shimonishi
2011/0116380 A1 5/2011 Sivakumar et al.

FOREIGN PATENT DOCUMENTS

JP 2009-027303 A 2/2009
JP 2009-077036 A 4/2009
(Continued)

OTHER PUBLICATIONS

Extended European Search Report received in corresponding European Application No. 12869519.4 dated Apr. 22, 2015.
(Continued)

*Primary Examiner* — Ashley Shivers
(74) *Attorney, Agent, or Firm* — Mattingly & Malur, PC

(57) ABSTRACT

A communication device that controls a transmission bandwidth of TCP communication includes a means for linearly increasing the transmission bandwidth of the TCP communication during a certain period of time after a data segment whose reception has been acknowledged enters an update state without detection of congestion in the TCP communication, a means for non-linearly increasing the transmission bandwidth after the certain period of time, a means for detecting congestion using a change rate of a discarding rate or a retransmission rate in the TCP communication, a means for estimating a retransmission rate and a change rate thereof using a previous history of the transmission bandwidth and a retransmission bandwidth, and a means for estimating a discarding rate and a change rate thereof using a previous history of the transmission bandwidth and an ACK reception number.

15 Claims, 27 Drawing Sheets

(56) References Cited

FOREIGN PATENT DOCUMENTS

| | | |
|---|---|---|
| JP | 2009-526494 A | 7/2009 |
| WO | 2007/092901 A2 | 8/2007 |
| WO | 2011/033894 A1 | 3/2011 |

OTHER PUBLICATIONS

Afanasyev, A. et al., "Host-to-Host Congestion Control for TCP", IEEE Communications Surveys & Tutorials, 2010, pp. 304-342, vol. 12, No. 3.

FIG. 3
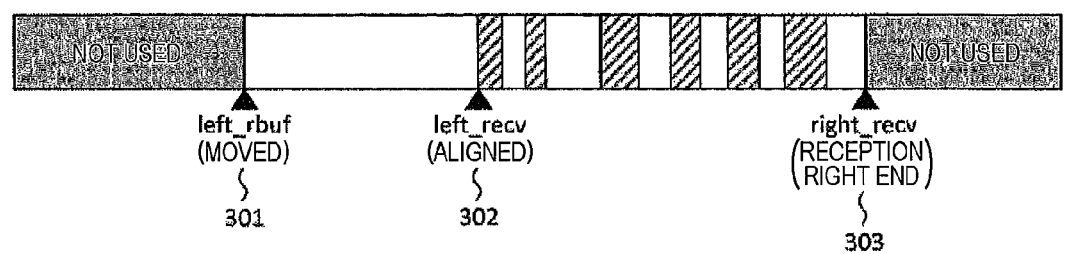
rbuf (RECEIVING BUFFER)
left_rbuf (MOVED) 301
left_recv (ALIGNED) 302
right_recv (RECEPTION RIGHT END) 303
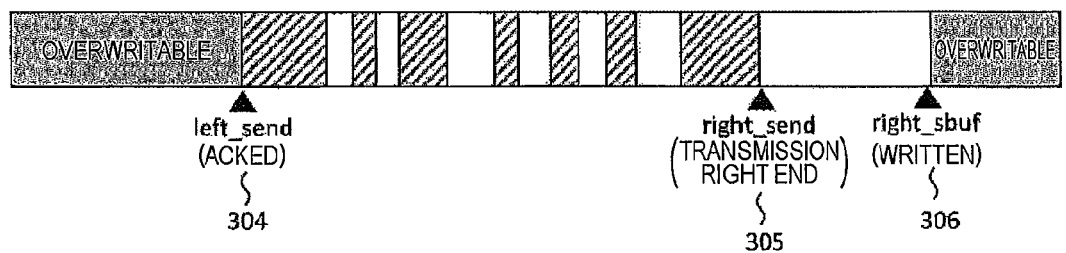
sbuf (TRANSMITTING BUFFER)
left_send (ACKED) 304
right_send (TRANSMISSION RIGHT END) 305
right_sbuf (WRITTEN) 306

FIG. 5

| 212 | | | | | | |
|---|---|---|---|---|---|---|
| | STATE TABLE | | | | | |

520-1

501 502
| VLD | connect_state |

503 504 505 506
| LIP | WIP | Lport | Wport |

507 508 509 510 511 512 513
| lan_state | lan_left_rbuf | lan_left_recv | lan_right_recv | lan_ws | lan_rtt | cwnd |

529 521 522 523
| lan_wan | lan_left_send | lan_right_send | lan_right_sbuf |

514 515 516 517 518 519
| wan_state | wan_left_rbuf | wan_left_recv | wan_right_recv | wan_ws | wan_rtt |

530 524 525 526 527
| wan_lan | wan_left_send | wan_right_send | wan_right_sbuf | old_wan_left_send |

536 532 533 534 535 537 538
| wan_mss | friendly mode | one-way mode | min_token | t_token | c_token | inc_time |

BANDWIDTH TABLE

| CONNECTION | BEFORE OLD REFERENCE TIME | | BEFORE REFERENCE TIME | | | | REFERENCE TIME | AFTER REFERENCE TIME | | | |
|---|---|---|---|---|---|---|---|---|---|---|---|
| | TRANSMISSION BANDWIDTH | CONTROL BANDWIDTH | TRANSMISSION BANDWIDTH | RETRANSMISSION BANDWIDTH | RECEPTION BANDWIDTH | CONTROL BANDWIDTH | | TRANSMISSION BIT INTEGRATION VALUE | RETRANSMISSION BIT INTEGRATION VALUE | ACK RECEPTION NUMBER | CONTROL BANDWIDTH |
| 1 | 180 | 180 | 200 | 20 | 180 | 180 | 160 | 7608 | 0 | 180 | 190 |
| ⋮ | ⋮ | ⋮ | ⋮ | ⋮ | ⋮ | ⋮ | ⋮ | ⋮ | ⋮ | ⋮ | ⋮ |
| n | 200 | 200 | 220 | 0 | 200 | 220 | 220 | 11080 | 512 | 210 | 210 |

213

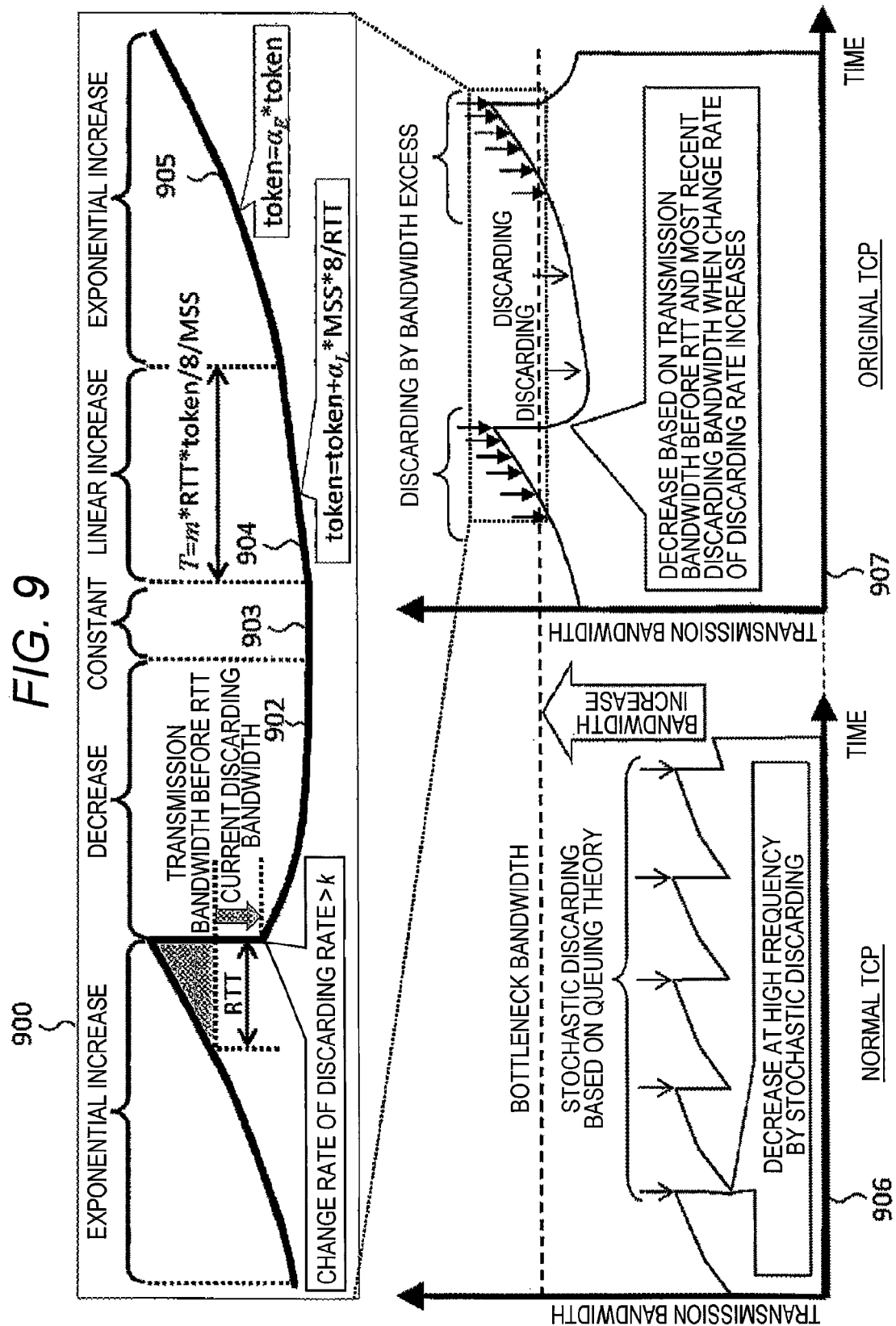

FIG. 23

MODE/MINIMUM BANDWIDTH DESIGNATION TABLE 740

| # | TRANSMISSION IP/ SUB NETWORK | DESTINATION IP/ SUB NETWORK | TRANSMISSION PORT | DESTINATION PORT | FRIENDLY | MINIMUM BANDWIDTH |
|---|---|---|---|---|---|---|
| 1 | Any | 192.168.1.0/24 | Any | Any | VALID | 128kbps |
| 2 | 192.168.2.0/24 | Any | 445 | Any | VALID | 1Mbps |
| 3 | Any | Any | Any | Any | INVALID | 128kbps |

COMMUNICATION DEVICE

TECHNICAL FIELD

The present invention relates to a communication device, a bandwidth control method, and communication system, and more particularly, to a communication device that controls a communication bandwidth between computers.

BACKGROUND ART

It has become common to use a wide area network (WAN) employing an Internet protocol-virtual private network (IP-VPN) technique or the like as a communication network between points used in a cloud or the like.

When a computer such as a terminal located at a certain point performs communication with a terminal located at another point, communication is performed through a line connecting a local area network (LAN) at its own point with a WAN and a line connecting a WAN with a LAN at another point. In the lines, an available bandwidth is limited according to a contract bandwidth.

A transmission control protocol (TCP) is commonly used in communication between terminals. In TCP communication, a receiving terminal gives feedback on a position of data that is transmitted by a transmitting terminal and received thereby to the transmitting terminal. When the fed-back position of the received data does not increase, the transmitting terminal determines that discarding has been detected.

Further, the transmitting terminal manages a parameter called a congestion window size (a transmittable data size even when reception is not notified of by the receiving terminal), and changes the congestion window size according to a round trip time (RTT) or whether discarding is detected.

When discarding is detected or when the RTT increases, a network is determined to be congested, and in this case, by reducing the window size, a transmission bandwidth is indirectly decreased, and thus congestion of the network is avoided. Further, when no discarding is detected or when the RTT decreases, the network is determined to be available, and in this case, by increasing the window size, the transmission bandwidth is indirectly increased, and a line bandwidth of the network is efficiently used.

As the RTT increases or as the discarding rate increases, the window size increases, and the bandwidth decreases.

As described above, in the communication using the TCP in the WAN, the transmission bandwidth significantly depends on the RTT and the discarding rate.

As a method of increasing the window size, there is also a technique of first non-linearly increasing the window size and then linearly increasing the window size after the window size exceeds a certain threshold value (PTL 1).

Meanwhile, PTL 2 discloses that in a communication system using the TCP in the WAN, a device connected to a receiving side terminal includes a means for giving feedback on all discarded segments to a device connected to a transmitting side terminal, and the transmitting side terminal includes a means for retransmitting the fed-back discarded segments and a means for controlling a transmission bandwidth based on a retransmission bandwidth and a discarded bandwidth.

CITATION LIST

Patent Literature

PTL 1: WO 2007/092901 A
PTL 2: WO 2011/033894 A

SUMMARY OF INVENTION

Technical Problem

In the communication using the TCP, since the transmission bandwidth significantly depends on the RTT and the discarding rate, there are cases in which a communication bandwidth much lower than a contract bandwidth is obtained in circumstances in which the RTT is large, the number of hops is large, and there are many discarded segments as in the WAN.

According to PTL 2, it is possible to secure a large communication bandwidth even in a line such as the WAN in which the RTT is long and the discarding rate is high.

However, when communication using a normal TCP and communication in which bandwidth control is performed as disclosed in PTL 2 share the same communication line, there are cases in which a line bandwidth is occupied by communication by PTL 2, and thus it is difficult for the communication using the normal TCP to secure the communication bandwidth.

In light of the foregoing, it is an object of the present invention to provide a communication device that controls a transmission bandwidth while allowing another communication using the normal TCP to be able to secure a communication bandwidth.

Solution to Problem

In order to solve at least one of the above problems, according to one aspect of the present invention, a first communication device connected to a network, including: a transmission bandwidth control unit that manages a bandwidth related to a packet to be transmitted from the first communication device to a second communication device via the network for each interval, and when increasing a control bandwidth used to transmit a packet in an interval after a current interval based on the managed bandwidth in the current interval and a bandwidth in a previous interval, increases the control bandwidth at a first increase rate during a certain period of time, and increases the control bandwidth at a second increase rate higher than the first increase rate after the certain period of time; and a transmitting unit that transmits a packet to the network according to the control bandwidth.

Advantageous Effects of Invention

According to the present invention, when the same communication line is shared by a plurality of communications, it is possible to prevent a phenomenon that a line bandwidth is occupied by a line based on bandwidth control in a single communication, a plurality of communications can secure a communication bandwidth, and thus a bandwidth is fairly used.

BRIEF DESCRIPTION OF DRAWINGS

FIG. 3 is an explanatory diagram of a pointer of a buffer.

FIG. 5 is a format diagram of the state table 212.

FIG. 8 is a format diagram of a bandwidth table 213.

FIG. 9 is an explanatory diagram for comparing a normal TCP with an original TCP.

Figure 18A:
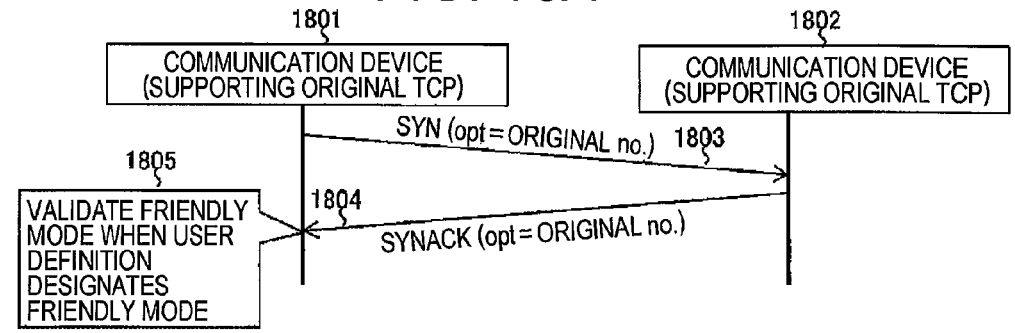
Figure 18B:
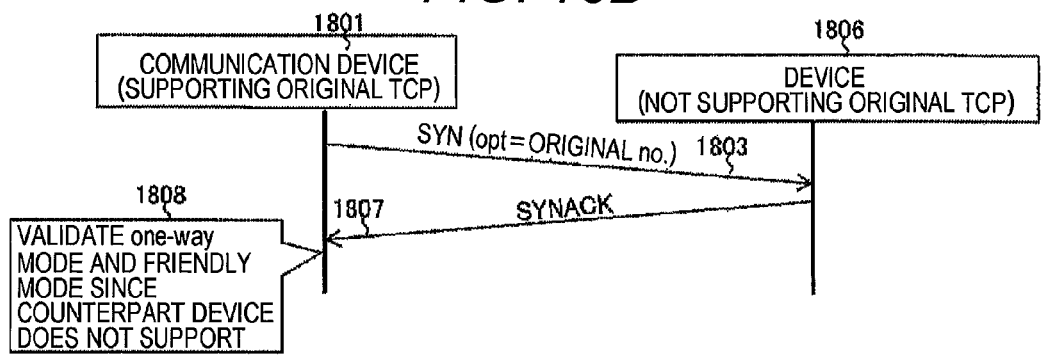
Figure 18C:
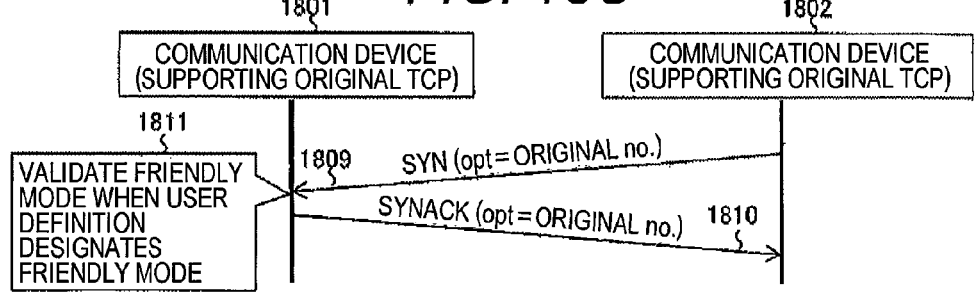
Figure 18D:
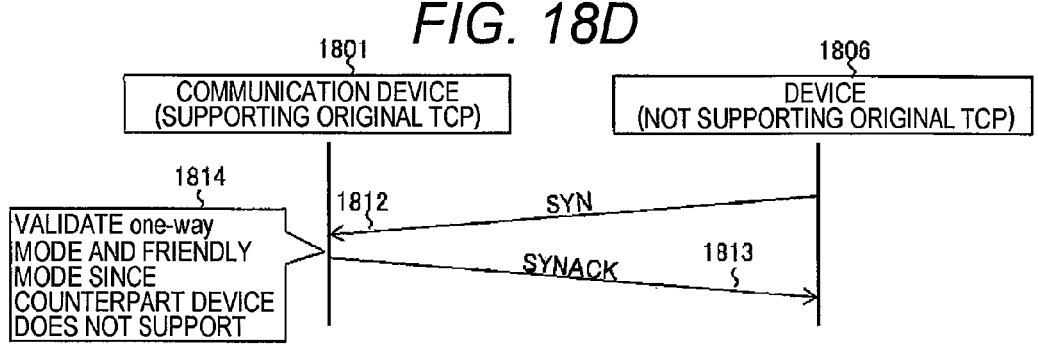

FIG. A-FIG. 18D are conceptual diagrams illustrating switching of a mode according to whether the counterpart device supports an original TCP.

Figure 19:
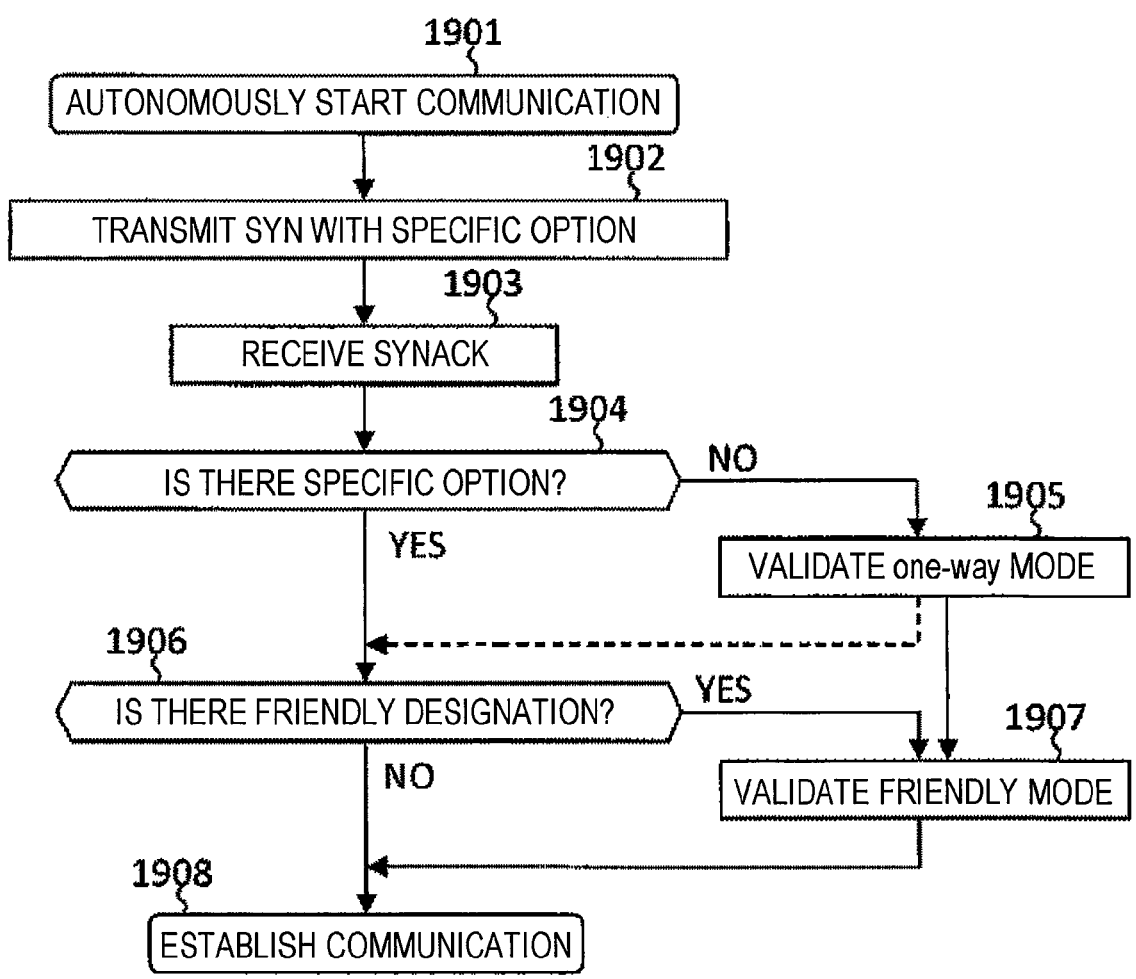

FIG. 19 is a conceptual diagram illustrating switching of a mode according to whether the counterpart device supports an original TCP.

Figure 20:
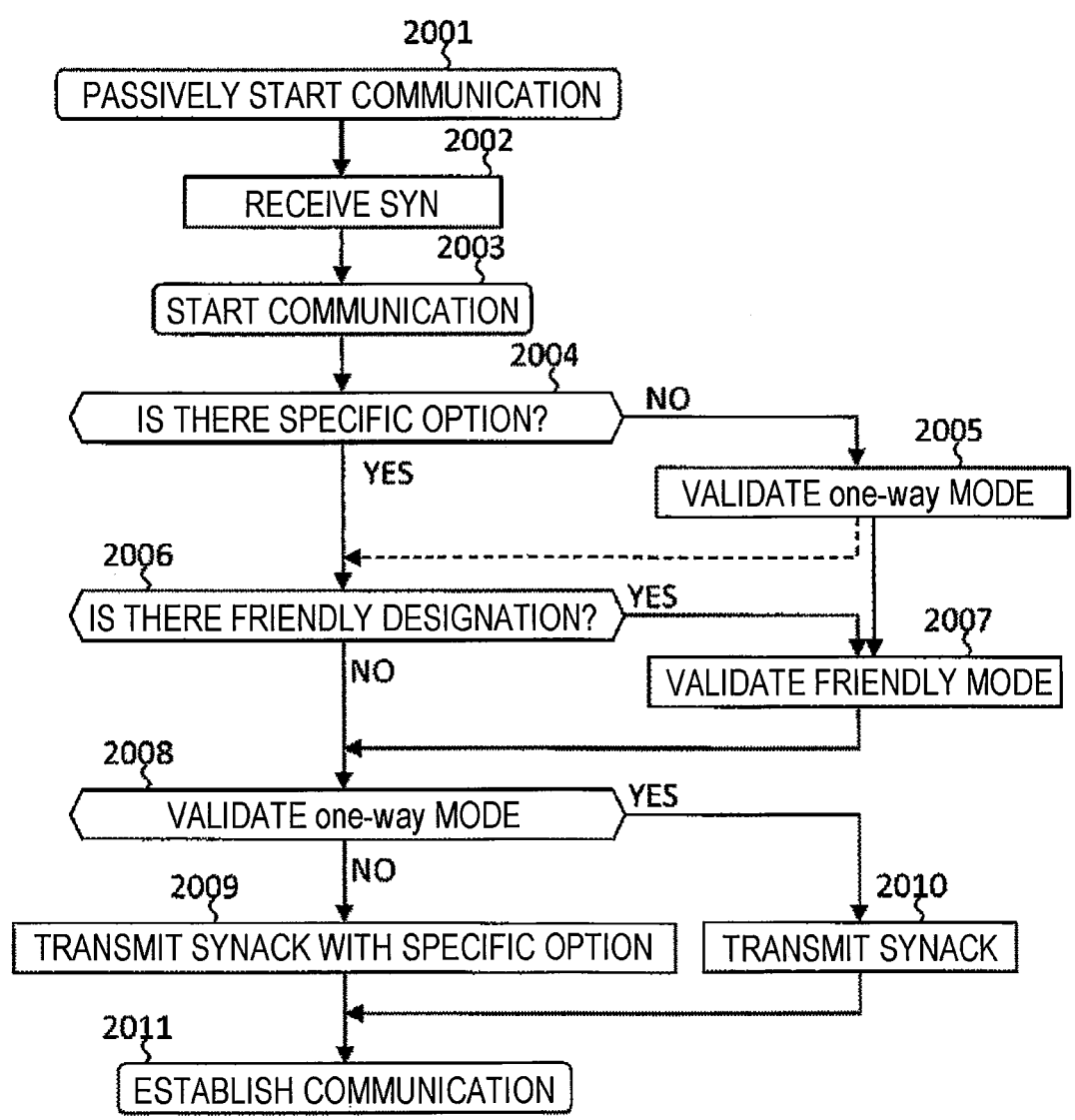

FIG. 20 is a conceptual diagram illustrating switching of a mode according to whether the counterpart device supports an original TCP.

Figure 21:
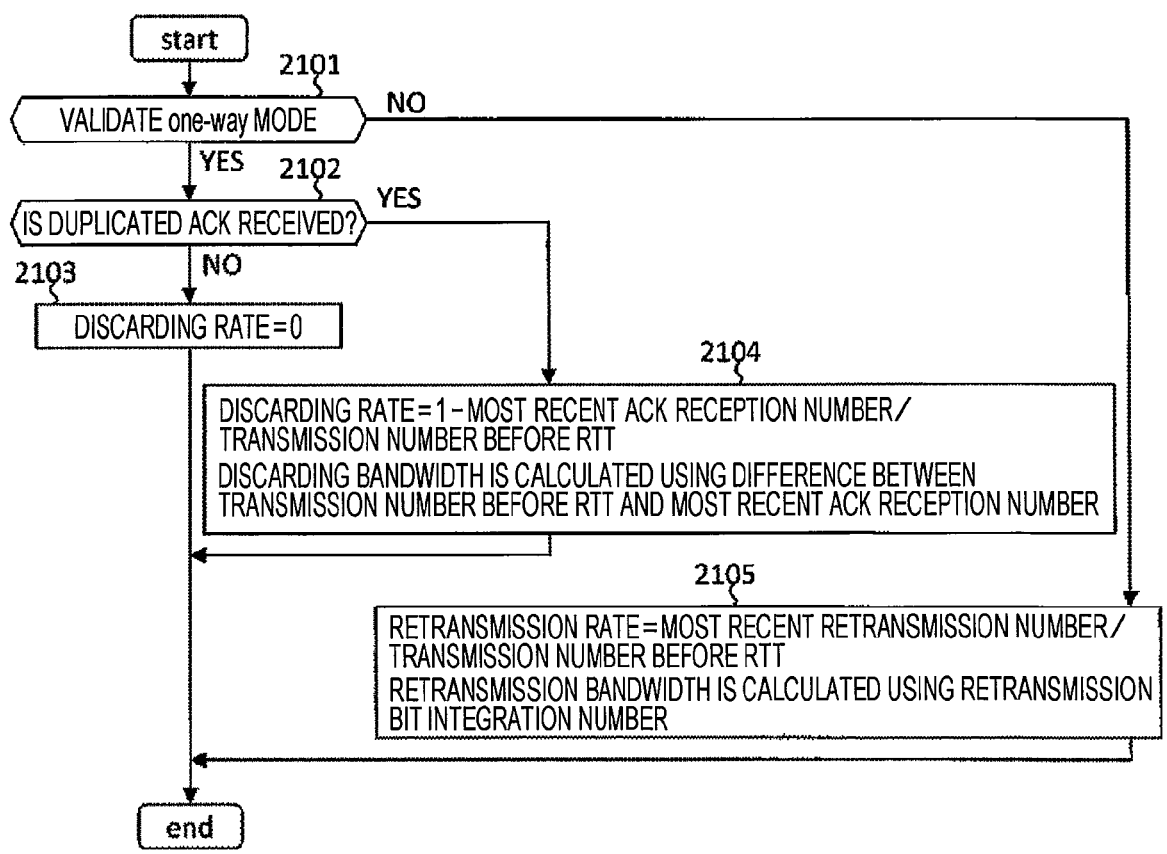

FIG. 21 is a flowchart illustrating a process of changing a method of calculating a discarding rate/retransmission rate and a retransmission bandwidth according to the presence or absence of a counterpart device.

Figure 22:
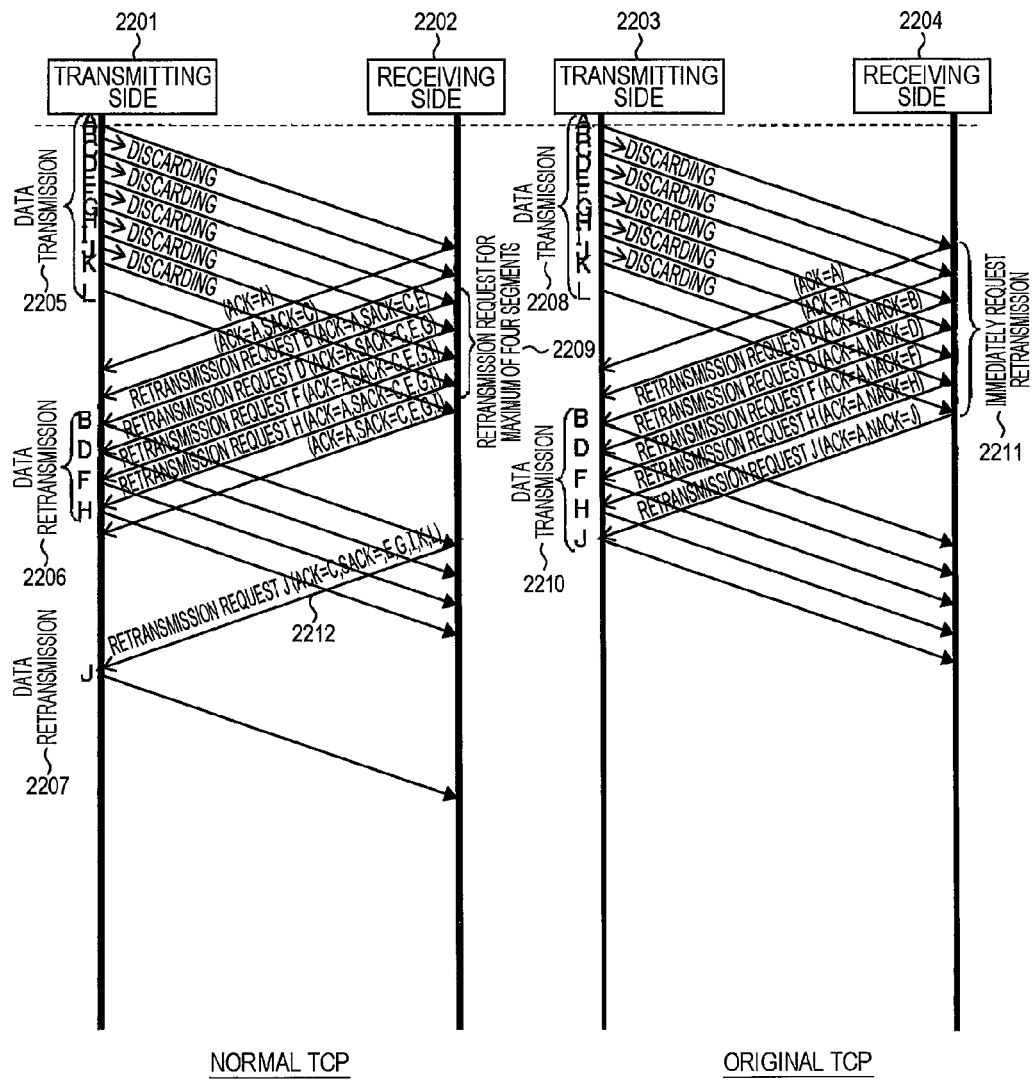

FIG. 22 illustrates a difference in a retransmission method between an original TCP and a normal TCP.

FIG. 23 is a format diagram of a mode/minimum bandwidth designation table.

DESCRIPTION OF EMBODIMENTS

Hereinafter, exemplary embodiment for carrying out the present invention will be described. In a first embodiment, a concrete example will be described.

First Embodiment

First, a problem to be solved by the present invention will be described with reference to FIG. 1.

Figure 1:
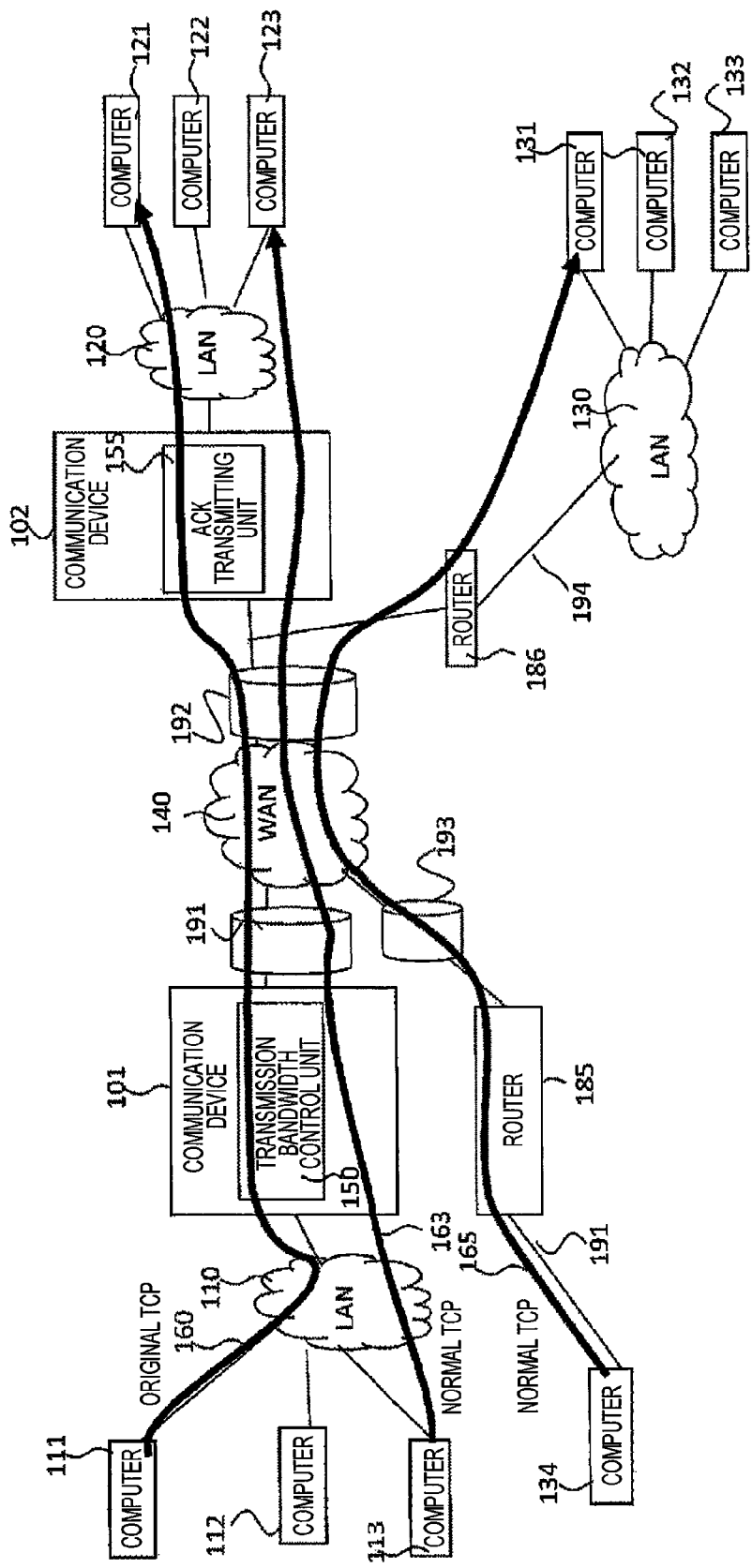
FIG. 1 is a configuration diagram of a network system including a communication device according to the present embodiment.

FIG. 1 is a configuration diagram of a network system including a communication device. Communication devices (which are also referred to as "relay devices" and hereinafter referred to simply as "devices") 101 and 102 and a router 186 are installed on a communication line connecting LANs 110, 120, and 130 at a plurality of points with a WAN 140. Further, a plurality of computers 111, 112, and 113 are connected to the communication device 101 via the LAN 110. A plurality of computers 121, 122, and 123 are connected to the communication device 102 via the LAN 120.

Further, the communication devices 101 and 102 are connected with the WAN 140 via access lines 191 and 192.

The communication device 101 includes a transmission bandwidth control unit 150 that selects a mode in which transmission bandwidth control is performed by an original TCP, for example, as disclosed in PTL 2, and performs bandwidth control according to the selected mode. The communication device 102 includes an ACK transmitting unit 155 that is necessary to increase communication with the communication device 101 at a high speed via the WAN 140. FIG. 1 illustrates an example in which in the communication device 101 and the communication device 102, two types of connections for performing data communication between computers are established. A first connection is a connection 160 (an original TCP) between the computer 111 and 121 in which bandwidth control is performed by the transmission bandwidth control unit 150. A second connection is a connection 163 based on the normal TCP between the computer 113 and 123 that does not involve the transmission bandwidth control unit. Both the transmission bandwidth control unit 150 and the ACK transmitting unit 155 may be equipped in the communication device 101 or 102.

A router 185 is connected to the computer 134 via a LAN (not illustrated). The router 185 is connected to the router 186 or the communication device 102 via the WAN 140. The router 186 is connected with a plurality of computers 131, 132, and 133 via the LAN 130. A connection 165 from the computer 131 illustrated in FIG. 1 is a connection based on the normal TCP, and the router 185 performs data communication according to a TCP protocol between the computer 134 and the computer 131 via the WAN.

As illustrated in FIG. 1, there are cases in which the line 192 is shared by communication of the connection 160 based on the original TCP and communications of the connection 163 and 165 based on the normal TCP. In the connection based on the original TCP, there are cases in which when the communication device 101 performs control such that the transmission bandwidth is abruptly increased, the line bandwidth is occupied, and thus it is difficult for communication using the normal TCP connection to secure a sufficient communication bandwidth. Further, even in the communication device 101, the connection 160 of the original TCP and the connection 163 of the normal TCP share the line 191 as well as the line 192. Between the connections 160 and 163, similarly, it is difficult for communication using the connection 163 based on the normal TCP to secure a sufficient communication bandwidth. On this account, an example of controlling a transmission bandwidth in the connection based on the original TCP such that a bandwidth of another connection can be secured in the communication device 101 or 102 will be described below in detail.

A certain number of computers, communication devices, and networks are illustrated in FIG. 1, but an appropriate number of computers, communication devices, and networks may be arranged. Examples of the computer include a server, an information processing device, a terminal, a portable information processing terminal, and a smart phone. Examples of communication between the computers include data transfer between a client and a server and file transfer between information processing devices. Hereinafter, communication based on a TCP, that is, a transmission control protocol related to a transport layer of the OSI reference model will be described as an example of the communication between the computers. Further, examples of the WAN 140 include a network connecting points in which the distance therebetween is longer than in the LAN or a network in which a communication delay between points is large.

Figure 2:
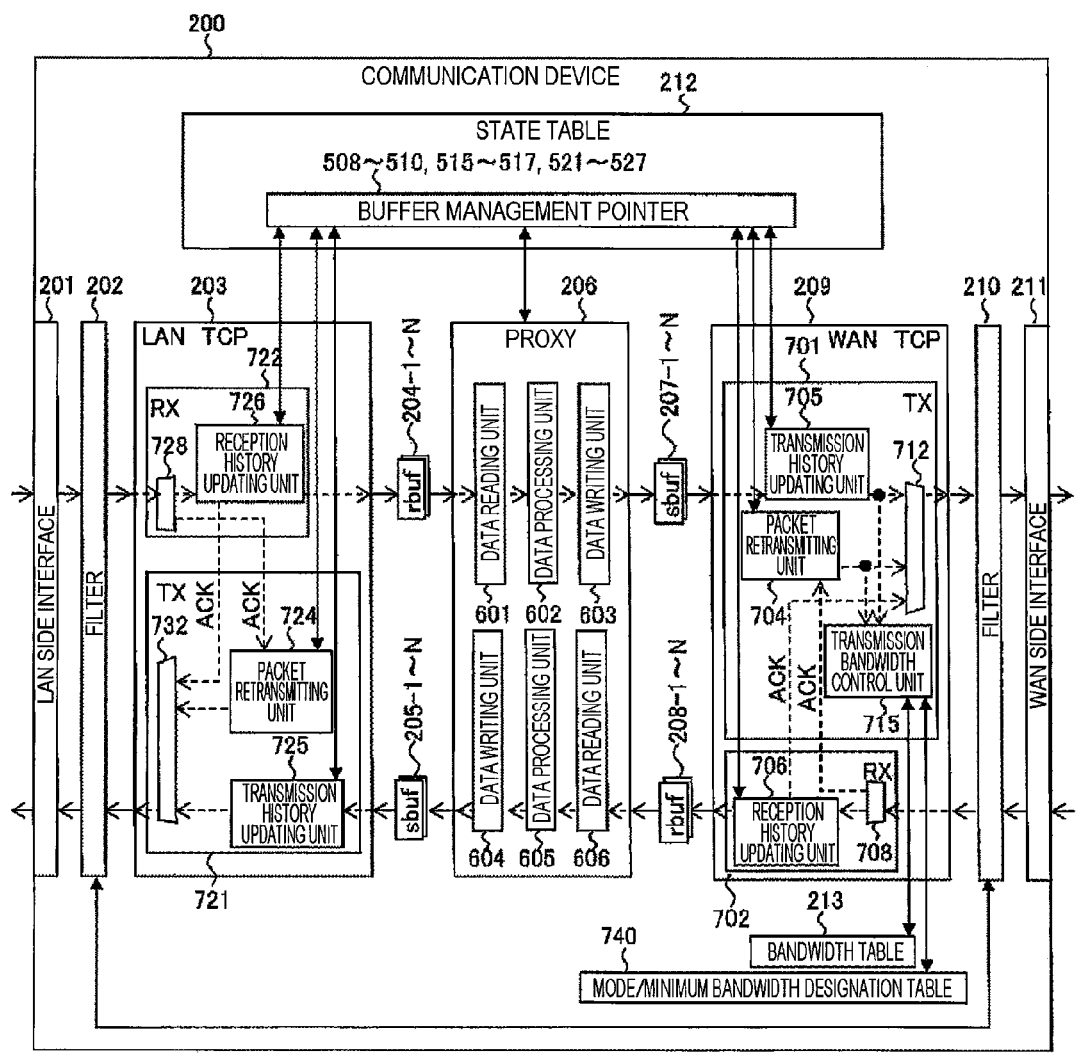
FIG. 2 is a block diagram of a communication device 200 according to the present embodiment.

FIG. 2 is a block diagram of a communication device 200 according to the present embodiment. The communication device 200 corresponds to the communication devices 101 and 102 of FIG. 1.

For example, the communication device 200 includes network interfaces (201 and 211) at a WAN side and a LAN side that transmits or receives a packet to or from an external WAN/LAN network, filters (202 and 210) that allow passage of a TCP packet that is a non-high speed target, a UDP packet or a ARP packet other than a TCP packet, or the like, TCP processing units 203 and 209 that perform control for TCP communication at the WAN side and the LAN side, N transmitting buffers 207 and N receiving buffers 208 that manages a TCP 209 at the WAN side, N transmitting buffer 205 and N receiving buffer 204 that manage a TCP 203 at the LAN side, and a proxy 206 that transfers data between the transmitting and receiving buffers. The communication device 200 includes a memory (not illustrated), and the memory includes a state table (state storage region) 212 including N entries, a bandwidth table 213 including N entries, and a mode/minimum bandwidth designation table 740 in which a communication mode and a minimum bandwidth of each TCP communication are designated. The number "Ns" may be different numbers.

The filters 202 and 210 determine whether a packet input from the outside is an original TCP target packet, and allows passages of a TCP packet that is a non-high speed target, a UDP packet (an IP protocol number) or an ARP packet other than a TCP packet, or the like. In case of the TCP packet, it is determined whether the TCP packet is a non-target using any one or a combination of an IP address and a port number. A packet by the connection 163 of FIG. 1 is an example thereof. Meanwhile, a determination as to whether an input packet corresponds to a UDP packet other than a TCP packet is performed based on an IP protocol number. It is determined whether an input packet is an ARP packet according to whether an ether type is an ARP without corresponding to any of IPv4 and IPv6. In the filter, a corresponding packet is not subject to processing of the original TCP, an input packet from the LAN side is transferred to the WAN, and an input packet from the WAN side is transferred to the LAN.

The details of the TCP processing units 203 and 209 and the proxy 206 will be described later, and an outline thereof will be herein described.

The TCP processing unit 203 at the LAN side includes a transmission history updating unit 725, a packet retransmitting unit 724, a reception history updating unit 726, a sorting unit 728, and a gathering unit 732. The reception history updating unit 726 accumulates received packet data in the receiving buffer 204 at the LAN side. Further, the reception history updating unit 726 updates information of buffer management pointers (508 to 510, 515 to 517, and 521 to 527) of the state table 212 according to the accumulated data. Further, the reception history updating unit 726 transmits an ACK packet indicating the position of received data through the gathering unit 732. The transmission history updating unit 725 converts transmission data read from the transmitting buffer 205 at the LAN side into a packet, transmits the packet, and updates information of the buffer management pointers (508 to 510, 515 to 517, and 521 to 527) of the state table 212 according to the read data. The details will be described with reference to FIG. 7B.

The TCP processing unit 209 at the WAN side includes a transmission bandwidth control unit 715, a transmission history updating unit 705, a packet retransmitting unit 704, a reception history updating unit 706, a sorting unit 708, and a gathering unit 712. The reception history updating unit 706 accumulates received packet data in the receiving buffer 208 at the WAN side. Further, the reception history updating unit 706 updates information of the buffer management pointers (508 to 510, 515 to 517, and 521 to 527) of the state table 212 according to the accumulated data. Further, the reception history updating unit 706 transmits an ACK packet indicating the position of the received data to another communication device 200 via the WAN 140 through the gathering unit 712. The details will be described with reference to FIG. 7A.

The transmission bandwidth control unit 715 accumulates information of a transmission bandwidth, a retransmission bandwidth, and an ACK reception number (the number of ACKs received via the WAN 140) in the bandwidth table 213. The transmission history updating unit 705 converts transmission data read from the transmitting buffer 207 at the WAN side into a packet, transmits the packet, and updates information of the buffer management pointers (508 to 510, 515 to 517, and 521 to 527) of the state table 212 according to the size of the read transmission data.

The proxy 206 includes data reading units (601 and 606), data processing units (602 and 605), and data writing units (603 and 604). The data reading units (601 and 606) updates information of the buffer management pointers (508 to 510, 515 to 517, and 521 to 527) of the state table 212 according to the size of data read from the receiving buffer (204 and 208). The data writing units (603 and 604) updates information of the buffer management pointers (508 to 510, 515 to 517, and 521 to 527) of the state table 212 according to the size of data written in the transmitting buffers (207 and 205). The details will be described with reference to FIG. 6.

FIG. 3 is an explanatory diagram of a pointer for management of the transmitting and receiving buffers. In FIG. 3, data is assumed to be written from the left to the right and read from the left to the right.

The receiving buffer manages a pointer right_recv 303 indicating the tail of received data, a pointer left_recv 302 indicating the boundary between aligned data and non-aligned data, and a left_rbuf 301 indicating the boundary between data read by the proxy 206 and data not read by the proxy 206 yet.

When data is received in order from the front without loss, the pointer right_recv 303 indicating the tail of received data increases by the size of the received data and moves to the right. When a retransmission packet is received an in a state in which a data segment (loss segment) that is not received and lost exists d so a loss segment dissipates, the pointer left_recv 302 indicating the boundary between aligned data and non-aligned data moves to the left end of a smallest loss segment. The proxy 206 reads data in order from the left_rbuf 301 indicating the boundary between read data and non-read data toward the right, and moves the left_rbuf 301 by the size of the read data. A maximum value of the size of the read data is the difference between the left_recv 302 and the left_rbuf 301.

The transmitting buffer manages a pointer right_sbuf 306 indicating the tail of data that has been written by the proxy 206 and is in a transmittable state, a pointer right_send 305 indicating the tail of already transmitted data, and a pointer left_send 304 indicating the tail of data in which an acknowledgement response has been received from the receiving side.

The pointer right_sbuf 306 indicating the tail of data that has been written by the proxy 206 and is in a transmittable state increases by the size of written data and moves to the right each time the proxy 206 writes data. New data is transmitted toward the right starting from the pointer right_send 305 indicating the tail of transmitted data, and the right_send 305 increases by the size of transmitted data and moves to the right. When an acknowledge response packet having a reception sequence number larger than the left_send 304 is received from the receiving side, the left_send 304 increases up to the reception sequence number described in the acknowledgement response (ACK) packet and moves to the right.

Figure 4:
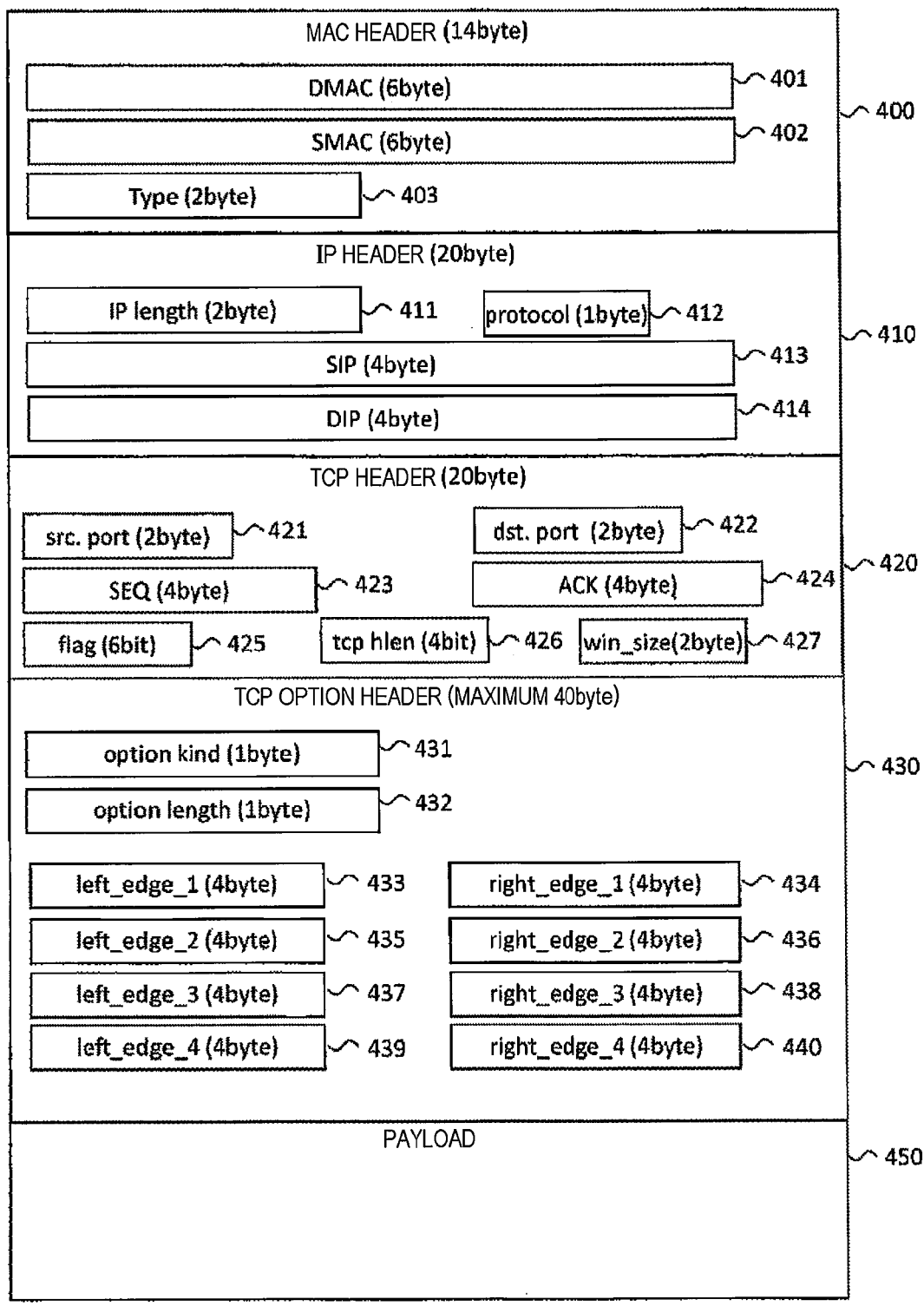
FIG. 4 is a format diagram of a packet.

FIG. 4 is a format diagram of a packet that is received by the communication device. The packet includes a MAC header 400, an IP header 410, a TCP header 420, a TCP option header 430, and a payload 450. The MAC header 400 includes a DMAC 401 representing a destination MAC address, an SMAC 402 representing a transmission source MAC address, and a type 403 representing a MAC frame type. The IP header 410 includes an IP length 411 representing a packet length excluding a MAC header, a protocol 412 representing a protocol number, an SIP 413 representing a transmission source IP address, and a DIP 414 representing a destination IP address. The TCP header 420 includes a src.port 421 representing a transmission source port number, a dst.port 422 representing a destination port number, an SEQ 423 representing a transmission sequence number, an ACK 424 representing a reception sequence number, a flag 425 representing a TCP flag number, and a tcp hlen 426 representing a TCP header length. The TCP option header 430 includes an option kind 431 representing an option kind, an option length 432 representing an option length, and left_edges_1 to 4 (433, 435, 437, and 439) and right_edges_1 to 4 (434, 436, 438, and 440) used to notify a transmitting computer of positions, that is, an interval of data segments that can be partially received. The left_edges_1 to 4 (433, 435, 437, and 439) and the right_edges_1 to 4 (434, 436, 438, and 440) are used to notify a transmitting computer of a position of a data segment that could not be partially received. Further, there are cases in which the TCP option header 430 is used for information exchange between devices or the like when TCP communication starts.

For example, an MSS option is used to notify the counterpart device of the size of an MSS receivable by its own device when TCP communication starts. An SACK option is used not only to notify the counterpart device of the fact that its own device can support the SACK option when TCP communication starts between the communication devices 101 and 102 of FIG. 1 but also to notify the counterpart device of a segment that can be partially received when discarding is detected during communication. A time stamp option is used to notify the counterpart device of a reception time of its own device during communication. As described above, the TCP option is used to notify the counterpart device of a function supportable by its own device or information when communication starts or during communication.

FIG. 5 is a format diagram of the state table 212.

The state table 212 of the communication device 200 includes n entries 520 used to record, for example, a state of each TCP connection.

For example, each entry 520 includes a VLD 501 describing whether an entry is in use, a connect_state 502 describing whether a connection at the LAN side or the WAN side is being established, an LIP 503 representing an IP address of a computer at the LAN side, a WIP 504 representing an IP address of a computer at the WAN side, an Lport 505 representing a TCP port number of a computer at the LAN side, a Wport 506 representing a TCP port number of a computer at the WAN side, a lan_state 507 representing a status of TCP communication at the LAN side, a lan_left_rbuf 508, a lan_left_recv 509, and lan_right_recv 510 that represent pointers for management of the receiving buffer at the LAN side, a lan_ws 511 representing a value of a window scale option at the LAN side, a lan_rtt 512 representing an average RTT at the LAN side, a cwnd 513 representing a congestion window size at the LAN side, a lan_wan 529 representing the size of data that is read from the receiving buffer at the LAN side and being processed, a lan_left_send 521, a lan_right_send 522, and a lan_right_sbuf 523 that represent pointers for management of the transmitting buffer at the LAN side, a wan_state 514 representing a status of TCP communication at the WAN side, a wan_left_rbuf 515, a wan_left_recv 516, and a wan_right_recv 517 that represent pointers for management of the receiving buffer at the WAN side, a wan_ws 518 representing a value of a window scale option at the WAN side, a wan_rtt 519 representing an average/initial RTT at the WAN side, a wan_mss 536 representing a maximum segment size MSS at the WAN side, a wan_lan 530 representing the size of data that is read from the receiving buffer at the WAN side and being processed, a wan_left_send 524, a wan_right_send 525, and a wan_right_sbuf 526 that represent pointers for management of the transmitting buffer at the WAN side, an old_wan_left_send 527 representing a segment in which an ACK has been received before the RTT, a friendly_mode 532 used to determine whether communication is to be performed in a friendly_mode on the normal TCP, a one-way_mode 533 used to decide whether communication based on the original TCP is to be performed when the counterpart device does not support communication based on the original TCP, a min_token 534 representing a minimum bandwidth, a t_token 535 representing a most recent control bandwidth in a state in which congestion is not detected, a c_token 537 representing a control bandwidth when a most recent period update is performed, and an inc_time 538 representing a time at which a bandwidth starts to increase.

Figure 6:
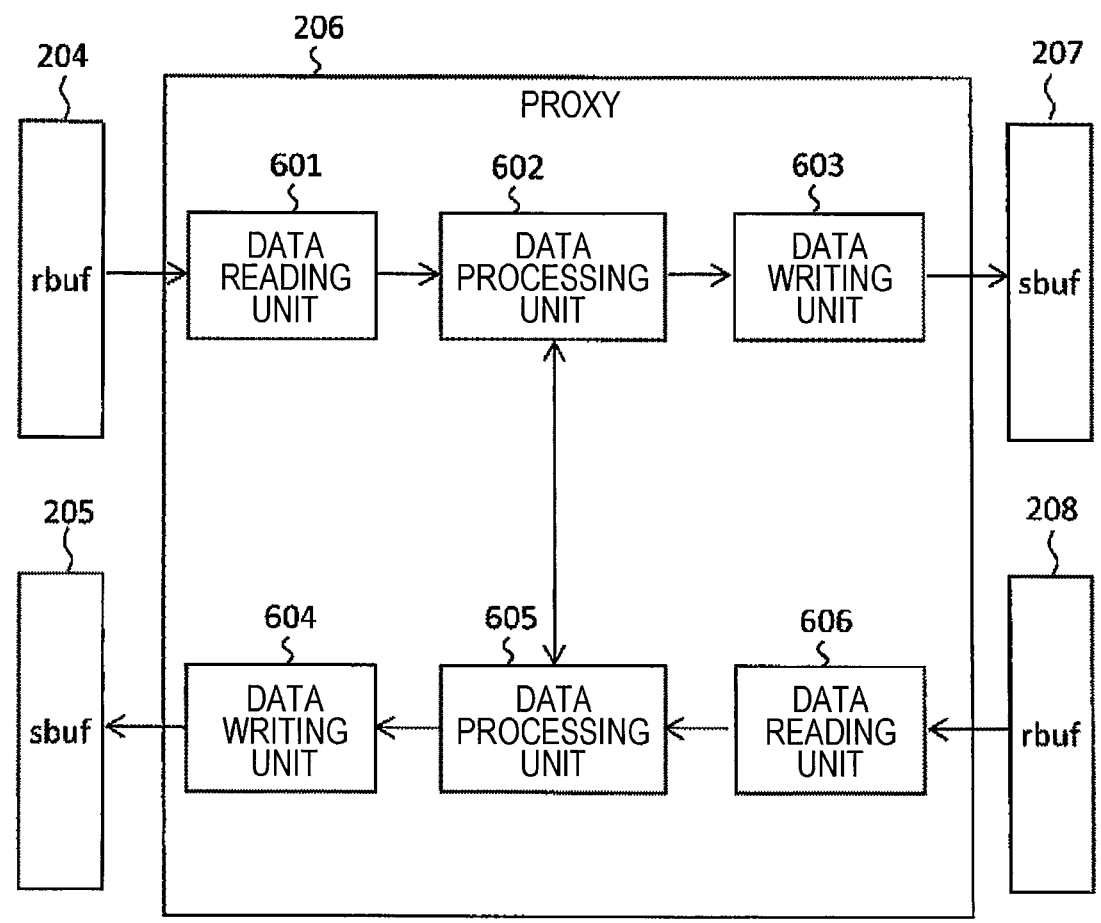
FIG. 6 is a block diagram of a proxy unit 206.

FIG. 6 is a block diagram of the proxy 206.

The proxy 206 includes a data reading unit 601 that reads data from the receiving buffer (rbuf) 204 at the LAN side, a data processing unit 602 that performs processing such as compression, decompression, encoding, decoding, deletion, duplication, and addition on the read data, a data writing unit 603 that writes the processed data in the transmitting buffer (sbuf) 207 at the WAN side, a data reading unit 606 that reads data from the receiving buffer (rbuf) 208 at the WAN side, a data processing unit 605 that performs processing such as compression, decompression, encoding, decoding, deletion, duplication, and addition on the read data, and a data writing unit 604 that writes the processed data in the transmitting buffer (sbuf) 205 at the LAN side. The data processing unit 602 and the data processing unit 605 may perform data exchange therebetween. Data processing other than the above-described processing may be performed.

The data reading unit 601 estimates the data size to be read and the data size after data processing from head data read from aligned data accumulated between the lan_left_rbuf 508 and the lan_left_recv 509. As the head data, a transport layer security (TLS)/secure socket layer (SSL) header or a server message block (SMB) header may be used. It is possible to estimate a plain text data size excluding a checksum after decoding or a header from a value described in the TLS/SSL header. It is possible to estimate a command data size after pre-fetching or the like from the SMB header. When the estimated data size after processing does not exceed a difference between the wan_right_sbuf 526 and the wan_left_send 524, that is, when the sum of non-transmitted data and data waiting for ACK confirmation does not exceed the transmitting buffer size wan_sbuf_size at the WAN side, data is read and transferred to the data processing unit 602. Further, a larger one of the estimated data size to be read and the data size after data processing is written in a lan_wan 528 of the state table 212.

The data reading unit 606 estimates the data size to be read and the size data after data processing from head data read from aligned data accumulated between the wan_left_rbuf 515 and the wan_left_recv 516. As the head data, a transport layer security (TLS)/secure socket layer (SSL) header or a server message block (SMB) header may be used. When the estimated data size after processing does not exceed a difference between the lan_right_sbuf 523 and the lan_left_send 521, that is, when the sum of non-transmitted data and data waiting for ACK confirmation does not exceed the transmitting buffer size lan_sbuf_size at the LAN side, data is read and transferred to the data processing unit 605. Further, a larger one of the estimated data size to be read and the data size after data processing is written in a wan_lan 529 of the state table 212.

Figure 7A:
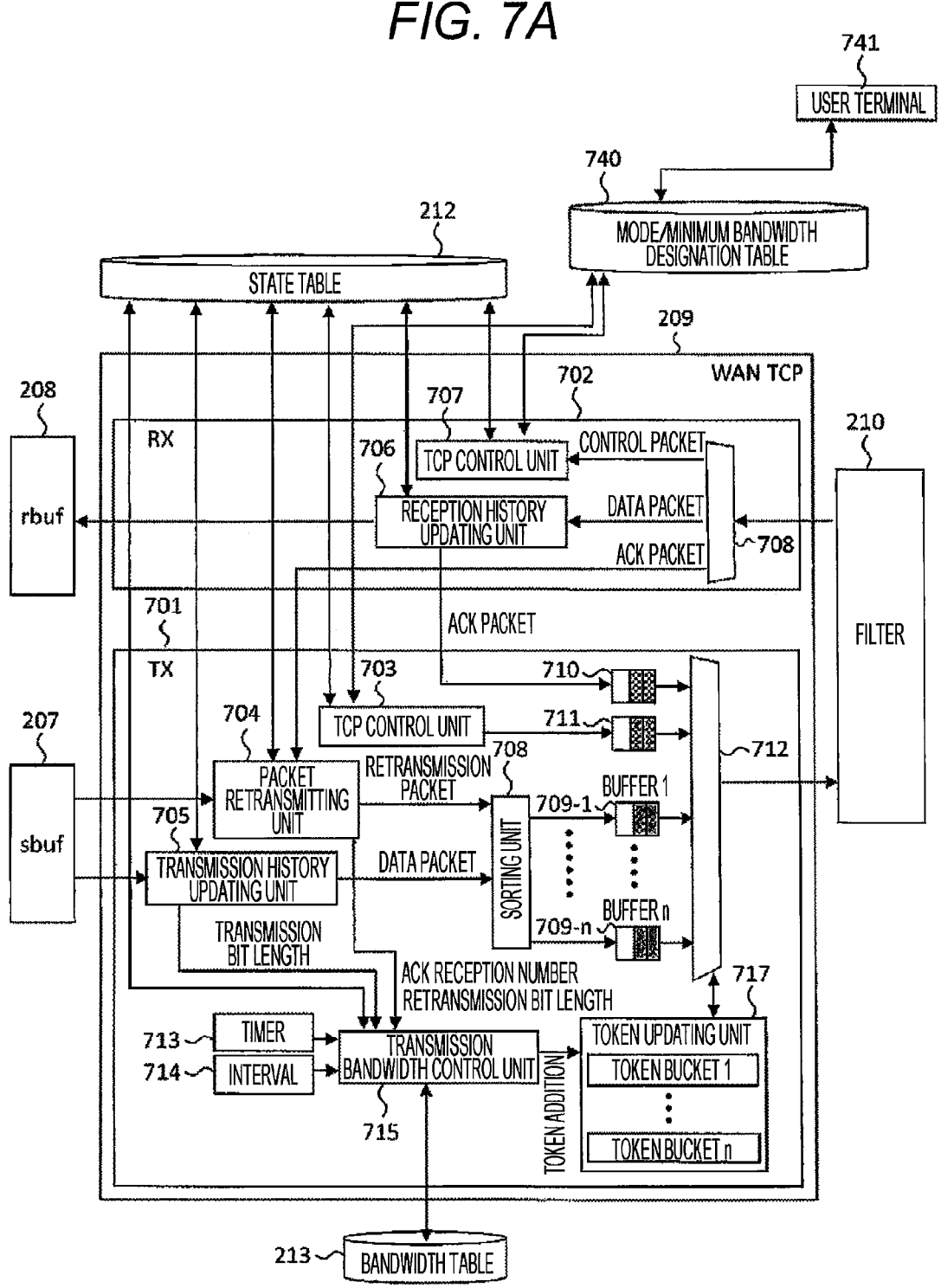
FIG. 7A is a block diagram of a TCP unit 209.

FIG. 7A is a block diagram the TCP processing unit 209 of the communication device 200 at the WAN side in FIG. 2.

The TCP processing unit 209 that implements TCP communication includes an RX unit (receiving unit) 702 that performs a reception process and a TX unit (transmitting unit) 701 that performs a transmission process.

The RX unit 702 includes the packet sorting unit 708 that separates received packets into a TCP control packet with a flag such as SYN or FIN, a data packet, and an ACK packet, a TCP control unit 707 that changes a TCP state (the lan_state 507 or the wan_state 514) in the state table 212 based on a flag number described in the TCP control packet, and changes the communication mode (the friendly_mode 532 or the one-way_mode 533) or the minimum bandwidth min_token 534 in the state table 212 based on the presence or absence of an option number described in the TCP control packet or a mode and a minimum bandwidth designated in the mode/minimum bandwidth designation table 740, and the reception history updating unit 706 that changes the buffer management pointer in the state table 212 based on the transmission sequence number SEQ 423 and the reception sequence number ACK 424 of the received data packet, and transmits the ACK packet.

A method in which the TCP control unit 707 changes the communication mode (the friendly_mode 532 or the one-way_mode 533) based on the presence or absence of the option number described in the TCP control packet when communication starts will be described later with reference to FIG. 18.

A method in which the TCP control unit 707 changes the communication mode (the friendly_mode 532) or the minimum bandwidth min_token 534 based on the mode and the minimum bandwidth designated in the mode/minimum bandwidth designation table 740 when communication starts will be described with reference to FIG. 20.

The TX unit 701 includes a TCP control unit 703 that transmits the TCP control packet using the TCP state, that is, the lan_state 507, the wan_state 514 in the state table 212, the packet retransmitting unit 704 that changes the buffer management pointer in the state table 212 based on the received ACK packet, reads and retransmits data from the transmitting buffer (sbuf) 207 using the partial acknowledgement response, that is, the left_edges_1 to 4 (433, 435, 436, and 439) and the right_edges_1 to 4 (434, 436, 438, and 440) described in the received ACK packet, the packet retransmitting unit 704 that notifies the transmission bandwidth control unit 715 of a retransmission bit length and an ACK reception number, the transmission history updating unit 705 that transmits a packet including data read from the transmitting buffer (sbuf) 207, changes the buffer management pointer in the state table 212, and notifies the transmission bandwidth control unit 715 of a transmission bit length, the sorting unit 708 that receives the retransmission packet and the data packet and sorts the retransmission packet and the data packet into buffers 1 to n (709-1 to 709-n), a timer 713 that generates a current time and notifies the transmission bandwidth control unit 715 of the current time, an interval storing unit 714 that holding an interval period of time (for example, a predetermined fixed value or a measured average RTT) and notifies the transmission bandwidth control unit 715 of the interval period of time, the transmission bandwidth control unit 715 that controls the bandwidth table 213, and notifies a token updating unit 717 of a token size of each TCP connection, the token updating unit 717 that manages a token bucket for each TCP connection, and notifies a multiplexer 712 of a transmittable connection, and the multiplexer 712 and buffers 709 to 711 that collect and output the ACK packet, the TCP control packet, the retransmission packet, and the data packet through a FIFO. Description content of the mode/minimum bandwidth designation table 740 may be changed from an external user terminal 741.

In the present embodiment, among the blocks of the TX unit 701, the blocks (for example, the token updating unit 717, the multiplexer 712, and the buffer 709) that transmit data according to a control bandwidth (a maximum transmission bandwidth) of each TCP communication are collectively referred to as a transmission control unit.

Figure 7B:
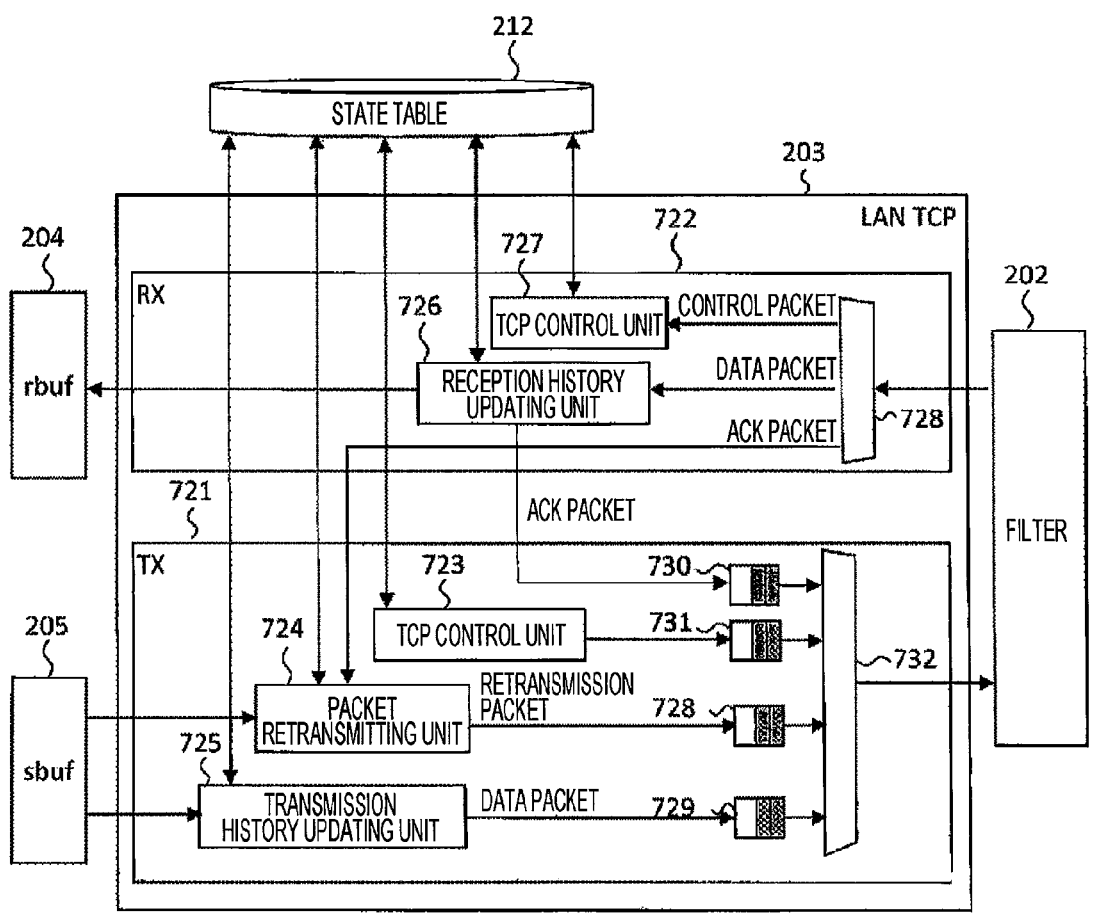
FIG. 7B is a block diagram of a TCP unit 203.

FIG. 7B is a block diagram of the TCP processing unit 203 at the LAN side in FIG. 2.

The TCP processing unit 203 that implements TCP communication includes an RX unit (receiving unit) 722 that performs a reception process and a TX unit (transmitting unit) 721 that performs a transmission process.

The RX unit 722 includes the packet sorting unit 728 that separates received packets into the TCP control packet, the data packet, and the ACK packet, a TCP control unit 727 that changes the TCP state, that is, the lan_state 507 and the wan_state 514 in the state table 212 based on the received TCP control packet, and the reception history updating unit 726 that changes the buffer management pointer in the state table 212 based on the transmission sequence number SEQ 423 and the reception sequence number ACK 424 of the received data packet, and transmits the ACK packet.

The TX unit 721 includes a TCP control unit 723 that transmits the TCP control packet using the TCP state, that is, the lan_state 507 and the wan_state 514 in the state table 212, the packet retransmitting unit 724 that changes the buffer management pointer in the state table 212 based on the received ACK packet, and reads and transmits data from the transmitting buffer (sbuf) 205 using the partial acknowledgement response, that is, the left_edges_1 to 4 (433, 435, 436, and 439) and the right_edges_1 to 4 (434, 436, 438, and 440) described in the received ACK packet, the transmission history updating unit 725 that transmits a packet including data read from the transmitting buffer (sbuf) 205 and changes the buffer management pointer in the state table 212, and a multiplexer 732 and buffers 729 to 731 that collect the ACK packet, the TCP control packet, the retransmission packet, the data packet through a FIFO.

Internal variables such as a reference time are managed in the transmission bandwidth control unit 715 and the bandwidth table 213 of the TCP processing unit 209 at the WAN side. When the difference between the reference time and the timer 713 is larger than the interval period of time in the interval storing unit 714, a time obtained by adding the interval period of time to the reference time is used as a new reference time. The reference time before addition is regarded as an old reference time. In other words, the reference time used immediately before the reference time currently being used is regarded as the old reference time. A fixed value may be used as the interval period of time when it uses the measured average RTT or the initial RTT (the wan_rtt 519).

The flow of a packet in the communication device 200 when a packet with data is received from the LAN side will be described with reference to FIG. 2.

The packet with data received from the LAN side arrives at the reception history updating unit 726 through the TCP processing unit 203 at the LAN side. The reception history updating unit 726 transmits the ACK packet to the packet with data to the LAN side through the gathering unit 732, and accumulates the data included in the packet in the receiving buffer rbuf 204 at the LAN side. Further, the reception history updating unit 726 updates the pointers in the state table 212 based on the accumulated data size. The data reading unit 601 reads aligned data accumulated in the receiving buffer rbuf 204 at the LAN side, and transfers the read data to the data processing unit 602. Further, the pointers in the state table 212 are updated based on the read data size.

The data processing unit 602 processes the data, and transfers the processed data to the data writing unit 603. Further, the processing data size of the state table 212 is updated based on the size of data being processed. The data writing unit 603 writes the processed data in the transmitting buffer (sbuf) 207 at the WAN side. Further, the pointers in the state table 212 are updated based on the size of the written data. The data written in the transmitting buffer (sbuf) 207 at the WAN side is read from the transmission history updating unit 705. The transmission bandwidth control unit 715 performs control such that the read data is transmitted to the WAN side as a packet with data.

In further detail, the reception history updating unit 726 calculates the residual amount of the receiving buffer by subtracting the difference between the lan_right_recv 510 and the lan_left_rbuf 508 from the maximum value of the receiving buffer at the LAN side. When the size of the payload 450 is the residual amount of the receiving buffer or less, all data included in the payload 450 is stored in the receiving buffer. When the size of the payload 450 is larger than the residual amount of the receiving buffer, data of the size corresponding to the residual amount of the receiving buffer from the head of the payload 450 is stored in the receiving buffer. When the stored data size is larger than 0, the pointers for management of the receiving buffer are updated based on the value of the SEQ 423 described in the TCP header 420 of the packet with data and the stored data size. For example, when a value obtained by adding the stored data size to the SEQ 423 described in the packet header is larger than the lan_right_recv 510, the lan_right_recv 510 is updated to the obtained by adding the stored data size to the SEQ 423. Further, the received data is written in the receiving buffer at the LAN side such that the tail end of the received data serves as the lan_right_recv 510. Thereafter, the ACK packet in which one of the pointers for management of the receiving buffer, that is, the lan_left_recv 509 is described in the ACK 424 of the TCP header 420 is transmitted to the LAN side.

In further detail, the transmission history updating unit 705 reads data of up to the maximum wan_right_sbuf 526 from the transmitting buffer (sbuf) 207 at the WAN side in the right direction from the wan_right_send 525. The wan_right_send 525 increases by the read data size and moves to the right. Further, the packet with data in which the read data is included in the payload 450, and the TCP header 420 in which the wan_right_send 525 is described as the SEQ 423 is added is transmitted to the packet with data.

(Variable Used for Control of Transmission Bandwidth of Data Output to WAN Side)

The transmission bandwidth control unit 715 controls a transmission bandwidth of data output to the WAN side of each TCP communication using a variable managed in the bandwidth table 213.

FIG. 8 illustrates a format of the bandwidth table 213 managed by the transmission bandwidth control unit 715.

The bandwidth table 213 records the reference time, a transmission bit integration value, a retransmission bit integration value, an ACK reception number, and a control bandwidth after the reference time, a transmission bandwidth, a retransmission bandwidth, a reception bandwidth, and a control bandwidth before the reference time, and a transmission bandwidth and a control bandwidth before the old reference time for each connection.

The control bandwidth after the reference time represents the control bandwidth (denoted by token in the present embodiment) at the current time. The transmission bandwidth after the reference time represents the transmission bandwidth (denoted by snd in the present embodiment) at the current time, and is obtained by dividing the transmission bit integration value after the reference time by the difference between the current time and the reference time. The retransmission bandwidth after the reference time represents the retransmission bandwidth (denoted by its in the present embodiment) at the current time, and is obtained by dividing the retransmission bit integration value after the reference time by the difference between the current time and the reference time. The reception bandwidth after the reference time represents the reception bandwidth (denoted by rcv in the present embodiment) at the current time, and is obtained by dividing a value obtained by integrating 8 and the MSS at the WAN side with the ACK reception number after the reference time by the difference between the current time and the reference time. The control bandwidth, the transmission bandwidth, the reception bandwidth, and the retransmission bandwidth before the reference time represents average values (denoted by old_token, old_snd, old_rcv, and old_rts in the present embodiment) of the control bandwidth, the transmission bandwidth, the reception bandwidth, and the retransmission bandwidth from the old reference time to the reference time. The control bandwidth and the transmission bandwidth before the old reference time represent the control bandwidth and the transmission bandwidth (denoted by old_old_token and old_old_snd in the present embodiment) until immediately before the old reference time. The retransmission rate/discarding rate old_rts_ratio before the reference time is obtained based on old its/old_old_snd or 1-old_rcv/old_old_snd. Further, the current retransmission rate/discarding rate rts_ratio after the reference time is obtained based on its/old_snd or 1-rcv/old_snd. As the interval period of time, the wan_rtt 519 described in the state table 212 may be used when a fixed value is used.

Figure 11:
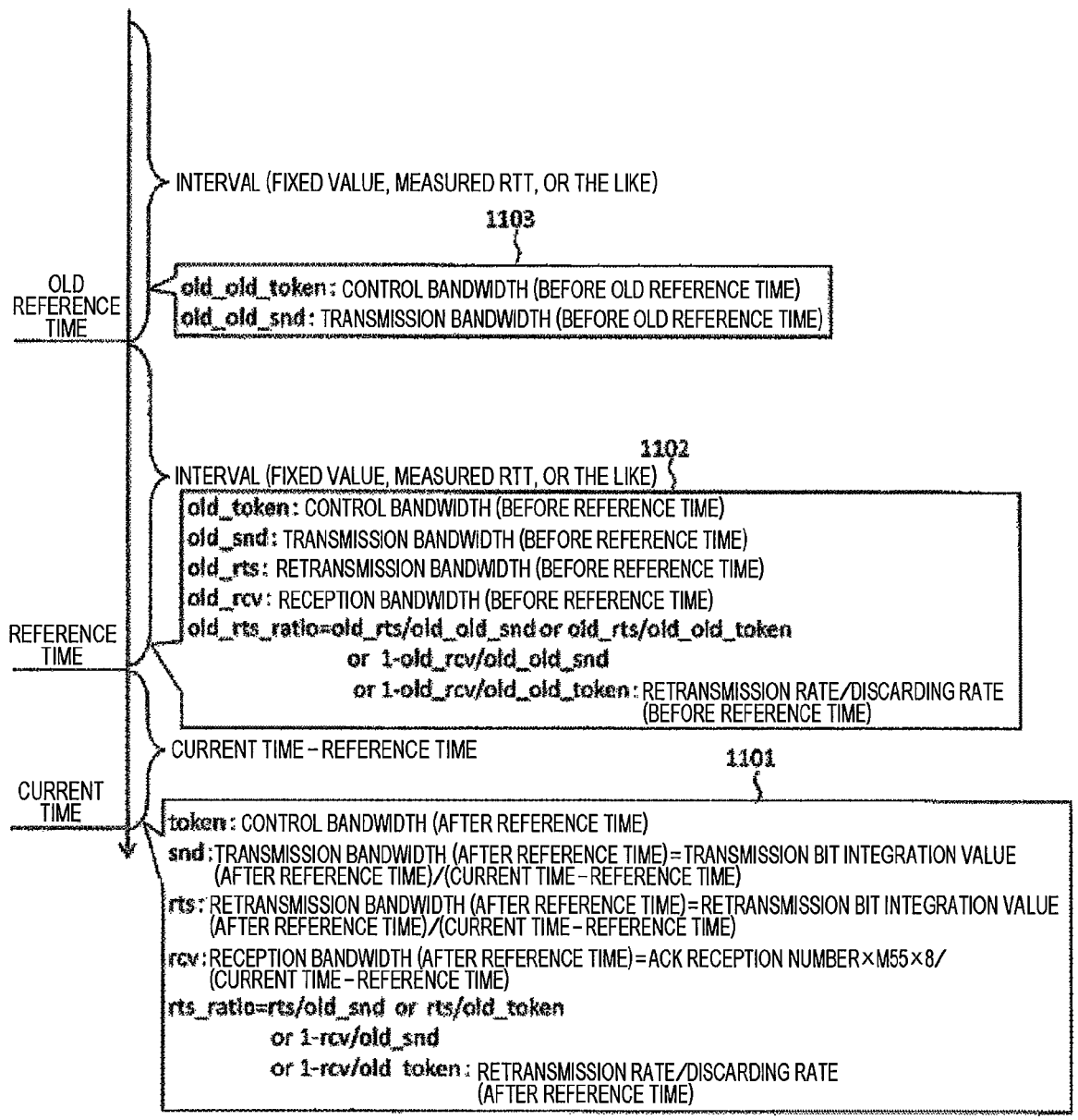
FIG. 11 is a conceptual diagram for describing meanings of values held in a bandwidth table 213 of each shaper.

FIG. 11 illustrates a relation between the old reference time, the reference time, and the current time and the control bandwidth, the transmission bandwidth, the reception bandwidth, the retransmission bandwidth, and the retransmission rate/discarding rate before and after the old reference time, the reference time, and the current time.

The difference between the reference time and the old reference time is the interval period of time. Averages values of the control bandwidth and the transmission bandwidth during the interval period of time before the old reference time are denoted by old_old_token and old_old_snd (1103). Averages values of the control bandwidth, the transmission bandwidth, the reception bandwidth, the retransmission bandwidth, and the retransmission rate/discarding rate between the old reference time and the reference time are denoted by old_token, old_snd, old_rcv, old_rts, and old_rts_ratio (1102). Average values of the control bandwidth, the transmission bandwidth, the reception bandwidth, the retransmission bandwidth, and the retransmission rate/discarding rate between the reference time and the current time are denoted by token, snd, rcv, rts, and rts_ratio (1101).

The transmission bandwidth control unit 715 calculates the discarding rate/retransmission rate (a rts_ratio 530 and a old_rts_ratio 531) using the above-described value described in the bandwidth table 213. The discarding rate/retransmission rate rts_ratio 530 at the current time is calculated based on rts/old_token, its/old_snd, 1-rcv/old_token, or 1-rcv/old_snd. The previous discarding rate/retransmission rate old_rts_ratio 531 is calculated based on old_rts/old_old_token, old_rts/old_old_snd, 1-old_rcv/old_old_token, or 1-old_rcv/old_old_snd. Further, the control bandwidth (token) is decided based on a change in the discarding rate/retransmission rate (a ratio of the old_rts_ratio 531 and the rts_ratio 530) and transferred to the token updating unit 717. Further, the state table 212 is updated. The details of a method of updating the control bandwidth (token) will be described later with reference to FIGS. 12 to 16.

The token updating unit 717 manages a token bucket for each TCP connection based on the value of the control bandwidth (token) transferred from the transmission bandwidth control unit 715, and notifies the multiplexer 712 of a transmittable connection.

(Process of Updating Control Bandwidth Token)

The details of a method of updating the control bandwidth (token) through the transmission bandwidth control unit 715 will be described with reference to explanatory diagrams of FIGS. 9, 10, and 17 and flowcharts of FIGS. 12 to 16.

FIG. 9 is an explanatory diagram illustrating a difference between normal TCP communication and original TCP communication and a method of controlling the transmission bandwidth of the original TCP.

In the normal TCP communication, when discarding occurs once, it is determined that congestion has been detected, and the transmission bandwidth decreases at a constant rate (906). In the network, even when the bottleneck bandwidth is not used 100%, stochastic discarding occurs at a constant rate based on the queuing theory. For this reason, the transmission bandwidth decreases before reaching the bottleneck bandwidth and becomes the top speed, and thus it is difficult to use up the bottleneck bandwidth 100%.

In the original TCP, the discarding rate is obtained by dividing the most recent retransmission bandwidth by the transmission bandwidth before the RTT, and when the change rate of the discarding rate exceeds a predetermined threshold value k, it is determined that congestion has occurred, and the transmission bandwidth is decreased based on the transmission bandwidth before the RTT and the most recent retransmission bandwidth (902). The transmission bandwidth is determined to reach the bottleneck bandwidth when the change rate of the discarding rate increases. As a result, it is possible to continuously increase the transmission bandwidth until the transmission bandwidth reaches the bottleneck bandwidth and becomes the top speed without being influenced by stochastic discarding.

In the original TCP, after the transmission bandwidth is decreased (902), the transmission bandwidth is maintained constant according to the ACK reception number until the position of a segment for which an ACK has been received changes (903). When the position of a segment for which an ACK has been received starts to be updated, the transmission bandwidth is increased gradually, for example, linearly during a certain period of time T (904). When the certain period of time T in which the transmission bandwidth is increased gradually, for example, linearly, elapses, it is changed to an abruptly increasing method (for example, a non-linearly increasing method such as an exponentially increasing method) (905). The period of time T may be decided according to the RTT and the token (control bandwidth) may be decided in proportion to an integration thereof. As a result, a communication device in which a period of time in which the transmission bandwidth is linearly increased is decided according to the RTT and the previous history of the transmission bandwidth. In other words, the transmission bandwidth control unit 715 has first control mode and a second control mode, and performs control such that bandwidth control in the first control mode is switched to bandwidth control in the second control mode after a certain period of time elapses. The increase rate of the transmission bandwidth in the second control mode may be higher than the increase rate in the first control mode. Further, the certain period of time T is a certain period of time that can be changed, for example, by a management terminal connected to the communication device 200.

Through the above-described transmission bandwidth control method, implemented is a communication device in which during a certain period of time after a data segment whose reception has been acknowledged enters an update state without detection of congestion of a network, the transmission bandwidth of the TCP communication is linearly increased, and thereafter the transmission bandwidth is non-linearly increased. Further, implemented are a communication device that detects congestion of a network using the change rate of the discarding rate or the retransmission rate, a communication device that estimates the discarding rate or the retransmission rate and the change rate thereof using the previous history of the transmission bandwidth, the retransmission bandwidth, and the ACK reception number, and a communication device that decreases the transmission bandwidth using the previous history of the transmission bandwidth, the retransmission bandwidth, and the ACK reception number when congestion is detected.

During a certain period of time after a data segment whose reception has been acknowledged enters an update state without detection of congestion of a network, the transmission bandwidth is increased more gradually (for example, linearly) than in the normal TCP communication, and thus even when there is a competition with the normal TCP communication, the bandwidth of the normal TCP communication is prevented from being compressed, and it is easy for the normal TCP communication to secure a bandwidth. Further, after a certain period of time elapses, the transmission bandwidth is increased abruptly (for example, exponentially), and thus when there is no competition with the normal TCP communication, a period of time in which the transmission bandwidth reaches the bottleneck bandwidth and becomes the top speed can be reduced. Further, congestion of a network is detected using the change rate of the discarding rate or the retransmission rate, and thus it is possible to continuously increase the transmission bandwidth without being influenced by stochastic discarding until the transmission bandwidth reaches the bottleneck bandwidth and becomes the top speed.

Figure 10:
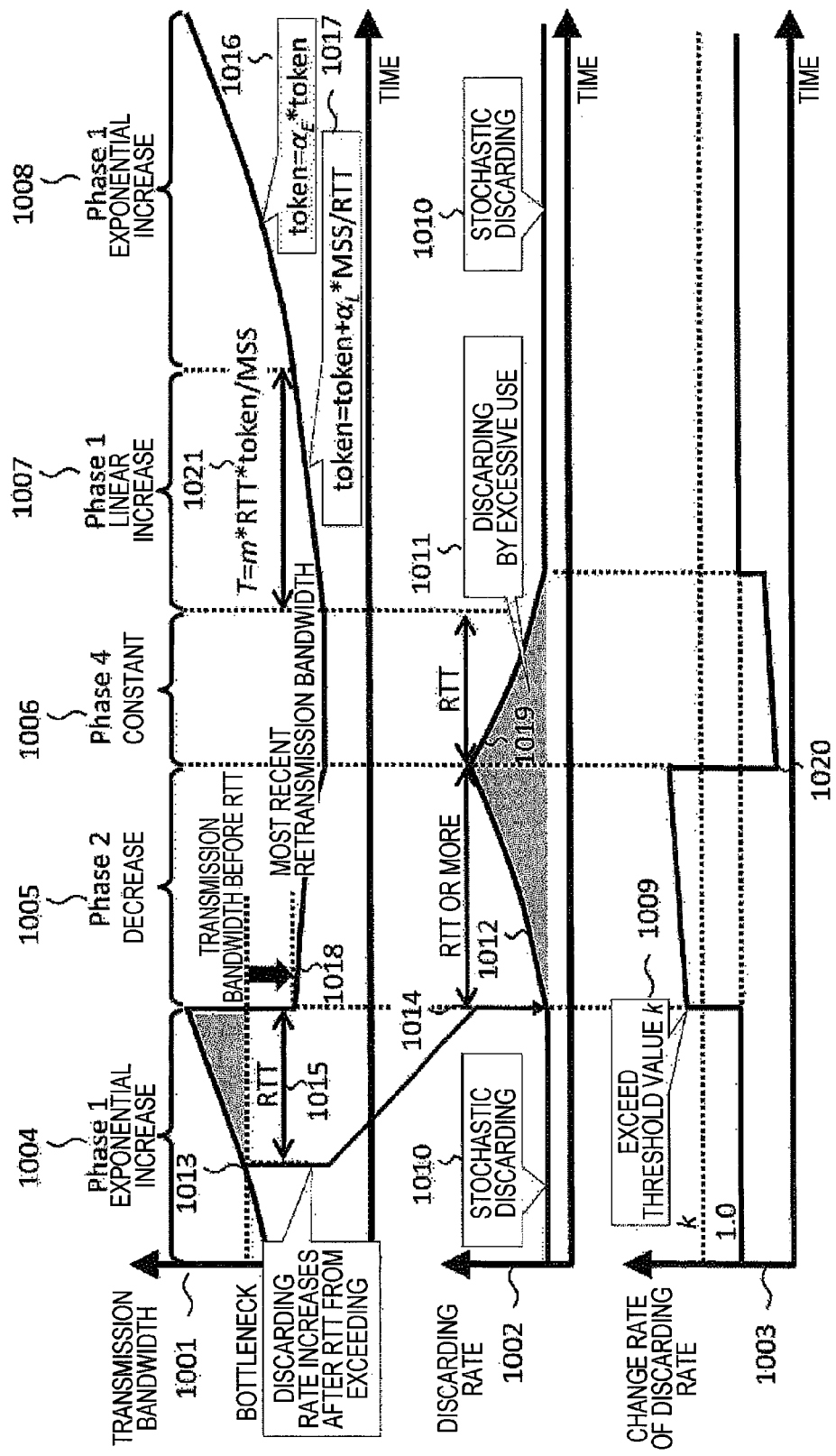
FIG. 10 is an explanatory diagram of congestion control using a change rate of a discarding rate.

FIG. 10 illustrates a graph representing time transition of a transmission bandwidth 1001, a discarding rate 1002, and a change rate 1003 of the discarding rate at a transmitting side of a device that is performing the original TCP communication.

An increase and decrease in the transmission bandwidth of the original TCP communication is roughly divided into four phases. A first phase corresponding to a step of increasing the transmission bandwidth, a second phase corresponds to a step of decreasing the transmission bandwidth, a third phase corresponds to a step of returning the transmission bandwidth, and a fourth phase corresponds to a step of maintaining the transmission bandwidth constant.

First, in the first phase, the transmission bandwidth increases (1004), and exceeds the bottleneck bandwidth at a certain point in time (1013). When the transmission bandwidth exceeds the bottleneck bandwidth, packet discarding occurs, but when it takes the RTT or more until the receiving side notifies the transmitting side of a discarded segment. Thus, when the RTT elapses after the transmission bandwidth exceeds the bottleneck bandwidth, the discarding rate increases (1014). The discarding rate is obtained by dividing the most recent retransmission bandwidth by the transmission bandwidth before the RTT. When the transmission bandwidth is smaller than the bottleneck bandwidth, only stochastic discarding occurs, and thus the discarding rate is maintained constant (1010). When the RTT elapses after the transmission bandwidth exceeds the bottleneck bandwidth, discarding by excessive use (1011) is added to stochastic discarding, and thus the discarding rate starts to increase (1012). When the discarding rate starts to increase, the change rate of the discarding rate abruptly increases from 1 and exceeds a threshold value k (1009).

In the original TCP communication, as described above, when the change rate of the discarding rate abruptly increases and exceeds the threshold value k, it is determined that congestion has occurred in a network.

When it is determined that congestion has occurred in a network, a value obtained by subtracting the current retransmission bandwidth from the transmission bandwidth before the RTT is regarded as a new transmission bandwidth (1018). The reason for calculating the new transmission bandwidth using the transmission bandwidth before the RTT is because a time at which the transmission bandwidth exceeds the bottleneck bandwidth is before the RTT or more. Since the increase in the discarding rate is continued for a while (1012), the transmission bandwidth is continuously decreased during that period of time. The step of decreasing the transmission bandwidth is the second phase (1005).

When the transmission bandwidth is decreased and smaller than the bottleneck bandwidth, the discarding rate starts to decrease (1019). When the change rate of the discarding rate is smaller than 1 and lower than the threshold value k (1020), it is determined that congestion has not occurred in a network.

Even after it is determined that congestion has not occurred in a network, the discarded packet retransmission process is continued. When a data segment whose reception has been acknowledged does not increase compared to before the RTT, it is determined that the discarded packet retransmission process is being continued, and the transmission bandwidth is maintained constant according to the ACK reception number. The step of maintaining the transmission bandwidth constant is the fourth phase (1006).

When a data segment whose reception has been acknowledged increases compared to before the RTT, it is determined that the discarded packet retransmission process is almost completed, and the transmission bandwidth is increased again (the first phase).

At the beginning stage, the transmission bandwidth control unit 715 increases the transmission bandwidth slowly, for example, linearly in the first control mode (1007). When congestion is not detected during the certain period of time T, thereafter, the transmission bandwidth control unit 715 abruptly (for example, non-linearly) increases the transmission bandwidth in the second control mode (1008). When the transmission bandwidth is non-linearly increased, the transmission bandwidth may be exponentially increased, for example, the transmission bandwidth is increased by $\alpha_E$ times at intervals of RTTs (1016). During the period of time T in which the initial transmission bandwidth is slowly (for example, linearly) increased, the transmission bandwidth may be decided based on the RTT and the token (control bandwidth) or may be proportional to an integration thereof (1021). Further, while the initial transmission bandwidth is slowly (for example, linearly) increased, the transmission bandwidth may be linearly increased at the speed that is proportional to the MSS/RTT at intervals of RTTs, and when the transmission bandwidth is linearly increased at the speed that is proportional to the MSS/RTT at intervals of RTTs, a proportionality coefficient $\alpha_L$ may be set to a value smaller than 1 (1017). As a result, implemented is a communication device in which a period of time in which the transmission bandwidth is linearly increased is decided according to the RTT and the previous history of the transmission bandwidth.

Through the above-described transmission bandwidth control method, implemented is a communication device in which during a certain period of time after a data segment whose reception has been acknowledged enters an update state without detection of congestion of a network, the transmission bandwidth of the TCP communication is linearly increased and thereafter the transmission bandwidth is non-linearly increased. Further, implemented are a communication device that detects congestion of a network using the change rate of the discarding rate or the retransmission rate, a communication device that estimates the discarding rate or the retransmission rate and the change rate thereof using the previous history of the transmission bandwidth, the retransmission bandwidth, and the ACK reception number, and a communication device that decreases the transmission bandwidth using the previous history of the transmission bandwidth, the retransmission bandwidth, and the ACK reception number when congestion is detected.

During a certain period of time after a data segment whose reception has been acknowledged enters an update state without detection of congestion of a network, the transmission bandwidth is increased more gradually (for example, linearly) than in the normal TCP communication, and thus even when there is a competition with the normal TCP communication, the bandwidth of the normal TCP communication is prevented from being compressed, and it is easy for the normal TCP communication to secure a bandwidth. Further, after a certain period of time elapses, the transmission bandwidth is increased abruptly (for example, exponentially), and thus when there is no competition with the normal TCP communication, a period of time in which the transmission bandwidth reaches the bottleneck bandwidth and becomes the top speed can be reduced. Further, congestion of a network is detected using the change rate of the discarding rate or the retransmission rate, and thus it is possible to continuously increase the transmission bandwidth without being influenced by stochastic discarding until the transmission bandwidth reaches the bottleneck bandwidth and becomes the top speed, and thus it is possible to use up a line bandwidth.

FIGS. 12 to 16 are flowcharts for describing the details of the method of updating the control bandwidth (token) through the transmission bandwidth control unit 715.

FIGS. 12 to 15 illustrate the details of bandwidth control in the original TCP, and FIG. 16 illustrates the detail of a bandwidth increasing method for protecting the normal TCP communication without allowing the original TCP communication to occupy the line bandwidth.

Figure 12A:
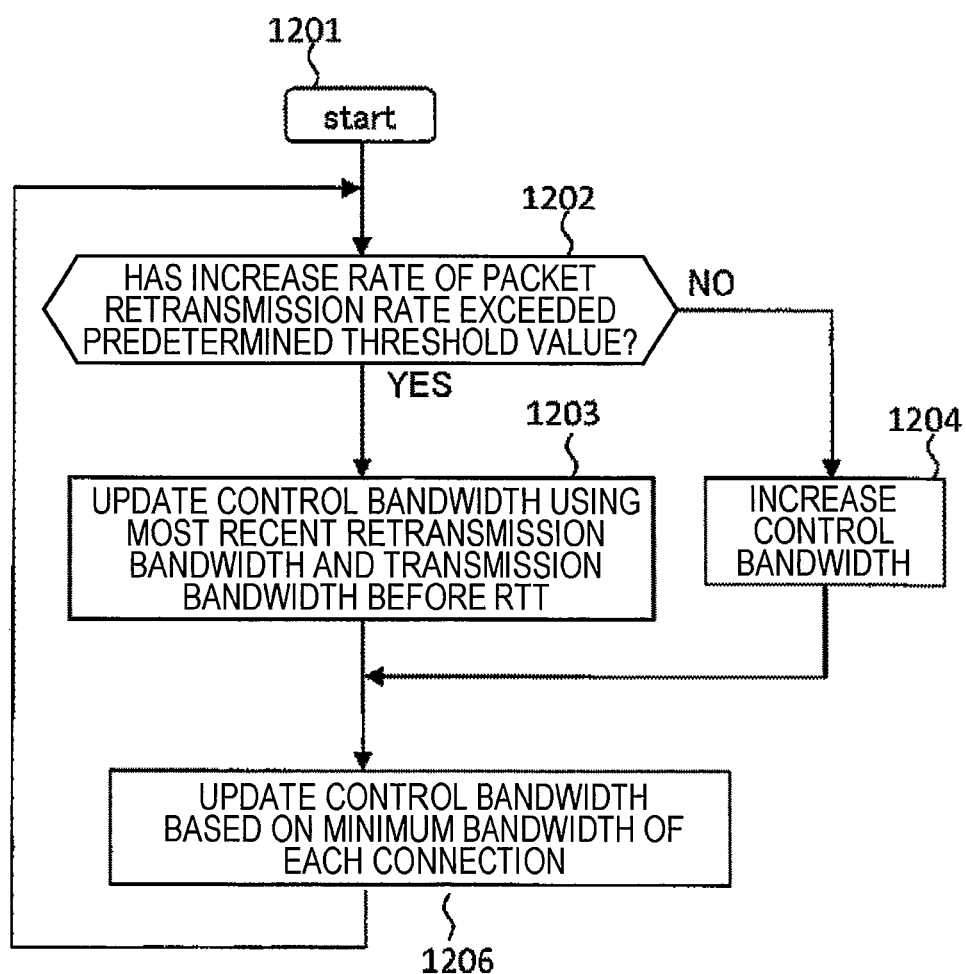
FIG. 12A is a flowchart A illustrating a process of updating a control bandwidth using a change rate of a retransmission rate, a connection number, and an access bandwidth.

FIG. 12A is a conceptual flowchart when the transmission bandwidth control unit 715 updates the control bandwidth (token). In the original TCP, as the transmission bandwidth control unit 715 performs the process according to the present flowchart, it is possible to implement bandwidth control based on the retransmission rate and use up the line bandwidth without depending on the RTT and the discarding rate. Steps of FIG. 12A are performed by the transmission bandwidth control unit 715.

When the transmission bandwidth control unit 715 starts a control bandwidth update process (step 1201), the transmission bandwidth control unit 715 determines whether the increase rate of the packet retransmission rate (=a value calculated based on rts/old_token, rts/old_snd, 1-rcv/old_token, or 1-rcv/old_snd) has exceeded a predetermined threshold value (step 1202). When the increase rate of the packet retransmission rate has exceeded the predetermined threshold value, the control bandwidth (token) is updated using the current retransmission bandwidth (rts), the previous control bandwidth (old_token) (before the reference time), or the previous transmission bandwidth (old_snd) (before the reference time) (step 1203). For example, the previous control bandwidth (before the reference time) is increased by an amount according to the current retransmission bandwidth, and set as the control bandwidth at the current time. Meanwhile, when it is determined in step 1202 that the increase rate of the packet retransmission rate has not exceeded the predetermined threshold value, the transmission bandwidth control unit 715 increases the control bandwidth (step 1204). After step 1203 or step 1204, the transmission bandwidth control unit 715 updates the control bandwidth (token) based on the minimum bandwidth (the min_token 534) of each connection (step 1206). As the control bandwidth (token) is changed, the amount of tokens accumulated in the token bucket changes, and thus it is possible to change the packet transmission rate.

Figure 12B:
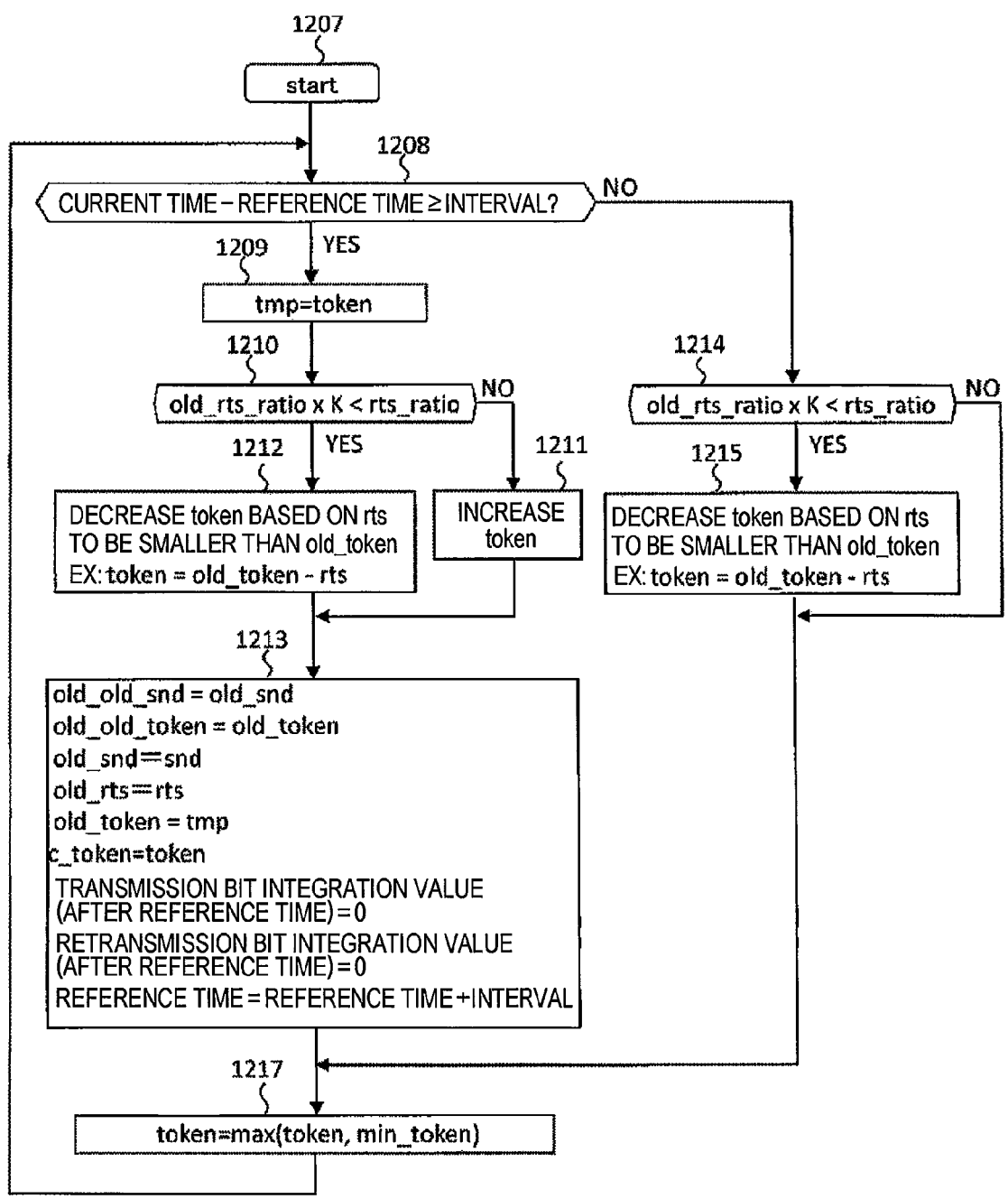
FIG. 12B is a flowchart B illustrating a process of updating a control bandwidth a change rate of a retransmission rate, a connection number, and an access bandwidth.

FIG. 12B is a flowchart when the transmission bandwidth control unit 715 changes the control bandwidth (token) using the value described in the bandwidth table 213. FIG. 12B is a more detailed example of FIG. 12A. Steps of FIG. 12B are performed by the transmission bandwidth control unit 715. In the original TCP, as the transmission bandwidth control unit 715 performs the process according to the present flowchart, it is possible to implement bandwidth control based on the retransmission rate is implemented and use up the line bandwidth without depending on the RTT and the discarding rate.

When the control bandwidth (token) update process starts (step 1207), the transmission bandwidth control unit 715 determines whether the difference between the current time output from the timer 713 and the reference time described in the bandwidth table 213 is an interval period of time output from the interval storing unit 714 (step 1208). As the interval period of time, for example, the wan_rtt 519 in the state table 212 in which, for example, an average value and an initial value of the measured RTT are recorded may be used. When YES is determined in step 1208, tmp is stored as the value of the current control bandwidth token after the reference time (step 1209). Further, for example, it is determined whether the retransmission rate (after the reference time) rts_ratio obtained based on the retransmission bit integration value (after the reference time)/(between the current time and the reference time)/the transmission bandwidth (before the reference time) stored in the bandwidth table 213 is larger than k times (K is a predetermined coefficient of 1 or more) of the old retransmission rate (before the reference time) old_rts_ratio obtained based on the retransmission bandwidth (before the reference time)/the transmission bandwidth (before the old reference time) (step 1210). Step 1210 corresponds to step 1202 described above. The value of K may be a fixed value or may change according to the value of a token. When YES is determined in step 1210, it is determined that congestion has occurred in a network, and the value of the control bandwidth (after the reference time) token is decreased using, for example, the retransmission bandwidth its to be smaller than the value of the control bandwidth (before the reference time) old_token. For example, the control bandwidth (after the reference time) token=the control bandwidth (before the reference time) old_token−the retransmission bandwidth (after the reference time) rts (step 1212). Step 1212 corresponds to step 1203 described above. When NO is determined in step 1210, the control bandwidth (after the reference time) token is increased (step 1211). As a method of increasing the control bandwidth (after the reference time) token, the control bandwidth may be linearly increased, may be exponentially increased, may be increased by a combination of a linear increase and an exponential increased, or may be increased first linearly and then exponentially, and the increase rate may be changed according to the control bandwidth (after the reference time) token. Step 1211 corresponds to 1204 described above.

After step 1212 or step 1211 is completed, for example, the update is performed such that the transmission bandwidth (before the old reference time) old_old_snd=the transmission bandwidth (before the reference time) old_snd, the transmission bandwidth (before the reference time) old_snd=the transmission bandwidth (after the reference time)snd, the retransmission bandwidth (before the reference time) old_rts=the retransmission bandwidth (after the reference time) rts, the reference time=the reference time+interval, the transmission bit integration value (after the reference time) =0, the retransmission bit integration value (after the reference time)=0, the control bandwidth (before the old reference time) old_old_token=the control bandwidth (before the reference time) old_token, the control bandwidth (before the reference time) old_token=tmp, and the control bandwidth c_token at the time of regular update=the new control bandwidth token, and the respective values are recorded in the bandwidth table 213 or the state table 212 (step 1213). Thereafter, the process transitions to step 1217.

Meanwhile, when NO is determined in step 1208, similarly to step 1210, it is determined whether the retransmission rate (after the reference time) rts_ratio obtained based on the retransmission bit integration value (after the reference time)/ (the current time−the reference time)/the transmission bandwidth (before the reference time) is larger than K times (K is a predetermined coefficient or 1 or more) of the old retransmission rate (before the reference time) old_rts_ratio obtained based on the retransmission bandwidth (before the reference time)/the transmission bandwidth (before the old reference time) (step 1214). The value of K may be a fixed value or may change according to the value of the token. Step 1214 corresponds to step 1202 described above. When YES is determined in step 1214, it is determines that congestion has occurred in a network, and similarly to step 1212, the value of the control bandwidth (after the reference time) token is decreased, for example, using the retransmission bandwidth rts to be smaller than the value of the control bandwidth (before the reference time) old_token. For example, the control bandwidth (after the reference time) token=the control bandwidth (before the reference time) old_token−the retransmission bandwidth (after the reference time) rts (step 1215). When NO is determined in step 1214, nothing is performed. Through this step, even when the interval period of time does not elapse, it is possible to detect congestion of a network is immediately detected based on the increase in the retransmission rate and update the control bandwidth. After this step, the process proceeds to step 1217.

In step 1217, when the control bandwidth (after the reference time) token is smaller than the minimum bandwidth min_token of each TCP communication, the control bandwidth (after the reference time) token is changed to the minimum bandwidth min_token 534 of each TCP communication (step 1217). In other words, a smaller one of tokens decided by two Formulas described in step 1217 of FIG. 12B is used. Further, it is possible to read data such as the token in step 1217 or the min_token 534 with reference to the state table 212 or the bandwidth table 213. As the control bandwidth (token) is changed, the amount of tokens accumulated in the token bucket changes, and thus it is possible to change the packet transmission rate.

As described above, in the original TCP, as in the flowchart described above with reference to FIG. 12, as bandwidth control is performed based on the discarding rate or the retransmission rate, it is possible to increase the transmission bandwidth until the transmission bandwidth reaches the bottleneck bandwidth and becomes the top speed without being influenced by the stochastic discarding. Thus, the original TCP can use up the line bandwidth without depending on the RTT and the discarding rate.

Figure 13:
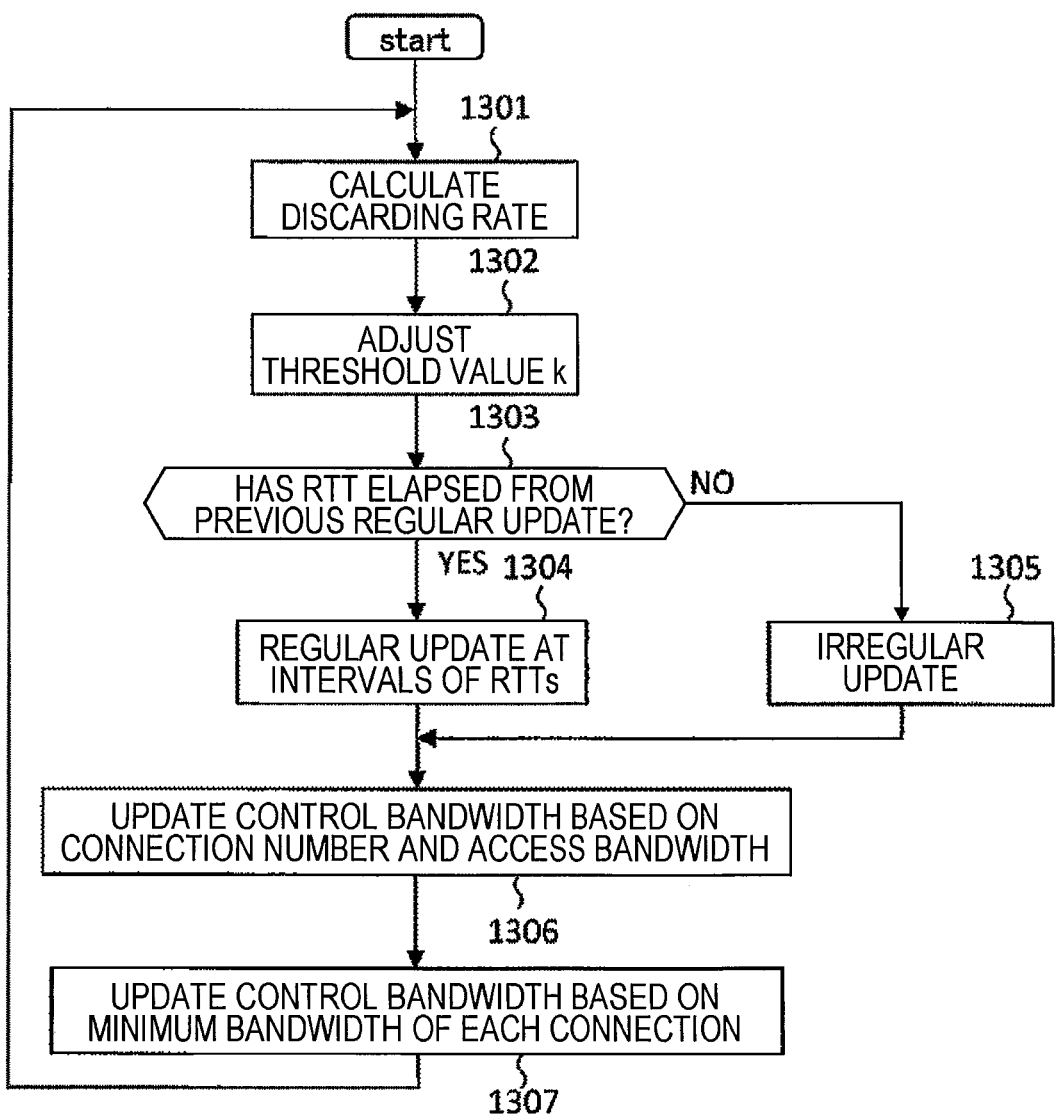
FIG. 13 is a main flowchart illustrating a process of updating a control bandwidth.
Figure 14:
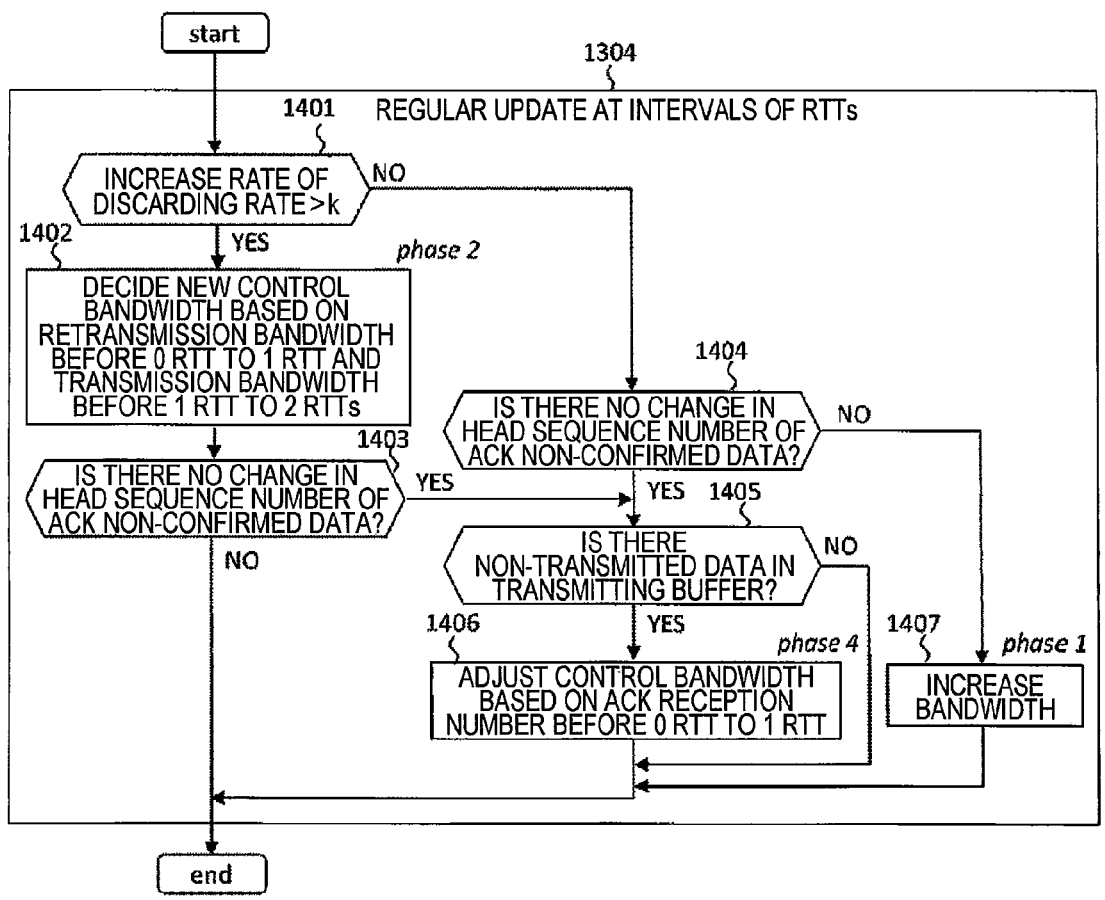
FIG. 14 is a flowchart illustrating a portion of regularly updating a control bandwidth at intervals of RTTs.
Figure 15:
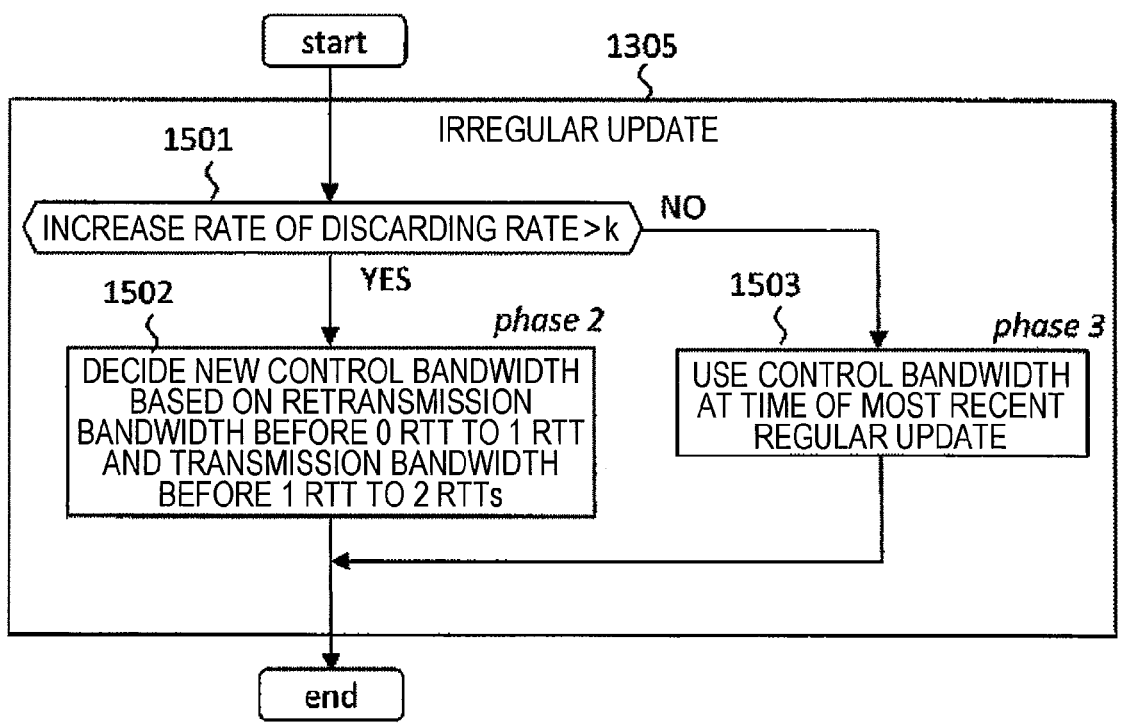
FIG. 15 is a flowchart of a portion of irregularly updating a control bandwidth.

FIGS. 13, 14, and 15 are flowcharts when the transmission bandwidth control unit 715 changes the control bandwidth (token) using the value described in the bandwidth table 213. The flowcharts illustrated in FIGS. 13, 14, and 15 are a more detailed example of a part of FIG. 12B. FIG. 13 is a main flowchart, and FIGS. 14 and 15 are flowcharts illustrating the details of a part of the process of FIG. 13. Steps of FIGS. 13, 14, and 15 are performed by the transmission bandwidth control unit 715. In the original TCP, as the transmission bandwidth control unit 715 performs the process according to the present flowchart, it is possible to implement bandwidth control based on the retransmission rate and use up the line bandwidth without depending on the RTT and the discarding rate.

FIG. 13 is a main flowchart when the transmission bandwidth control unit 715 changes the control bandwidth (token) using the value described in the bandwidth table 213.

The transmission bandwidth control unit 715 first calculates the discarding rate (1301). The discarding rate is calculated based on its/old_token, its/old_snd, 1-rcv/old_token, or 1-rcv/old_snd as described above with reference to FIG. 11. The retransmission rate may be used as the discarding rate. Then, the threshold value k is adjusted according to the value of the token (1302). When the value of the token is large, by decreasing the threshold value k, although the discarding rate is slightly increased, the change rate of the discarding rate easily exceeds the threshold value k, and congestion of a network is easily detected. Then, it is determined whether the RTT has elapsed from the previous regular update (step 1303). This step is a process corresponding to step 1208 of determining whether the difference between the current time and the reference time is an interval or more. When the RTT has elapsed, the regular update process that is performed at intervals of RTTs is performed (1304). When the RTT has not elapsed, an irregular update process is performed (1305). The details of a regular update 1304 and an irregular update 1305 will be described later with reference to FIG. 14 and FIG. 15. After the regular update 1304 and the irregular update 1305, the process of updating the control bandwidth (token) is performed based on the number of active connections and an access bandwidth (1306). Through this process, fairness between connections is secured. Further, the control bandwidth (token) is updated based on the minimum bandwidth min_token 534 of each TCP connection communication (step 1307).

FIG. 14 is a detailed flowchart of the regular update process 1304 of the control bandwidth (token) performed by the transmission bandwidth control unit 715.

In the regular update process 1304 performed by the transmission bandwidth control unit 715, first, it is determined whether the increase rate of the discarding rate (rts_ratio) has exceeded the threshold value k (step 1401). When the increase rate of the discarding rate (rts_ratio) has exceeded the threshold value k, the transmission bandwidth control unit 715 decides the new control bandwidth based on the retransmission bandwidth rts before 0 to RTT, the transmission bandwidth old_snd before RTT to 2 RTTs, or the control bandwidth old_token (step 1402). For example, the new control bandwidth token=the control bandwidth (before the reference time: before RTT to 2 RTTs) old_token−the retransmission bandwidth (after the reference time: before 0 to RTT) rts (step 1402). In the present disclosure, the process of step 1402 is called the second phase. Then, the value of the wan_left_send 524 representing the current segment for which the ACK has been received is compared with the value of the old_wan_left_send 527 representing the segment for which the ACK has been received before the RTT (step 1403), and when there is a change, the regular update 1304 performed at intervals of RTTs ends. When there is no change, the process proceeds to step 1405.

When it is determined in step 1401 that the increase rate of the discarding rate (rts_ratio) has not exceeded the threshold value k, the transmission bandwidth control unit 715 compares the value of the wan_left_send 524 representing the current segment for which the ACK has been received with the value of the old_wan_left_send 527 representing the segment for which the ACK has been received before the RTT (step 1404). When there is no change, the process proceeds to step 1405. In step 1405, the transmission bandwidth control unit 715 determines whether there is non-transmitted data with reference to the transmitting buffer 207 at the WAN side (step 1405). When there is non-transmitted data in the transmitting buffer 207, the transmission bandwidth control unit 715 adjusts the control bandwidth based on the ACK reception number before 0 to RTT (step 1406). For example, the new control bandwidth=the reception bandwidth (after the reference time: before 0 to RTT) rcv (step 1406). When step 1406 ends, the transmission bandwidth control unit 715 ends the regular update 1304 performed at intervals of RTTs. Further, when it is determined in step 1404 that the value of the wan_left_send 524 representing the current segment for which the ACK has been received is larger than the value of the old_wan_left_send 527 representing the segment for which the ACK has been received before the RTT, the control bandwidth (token) is increased (step 1407). In the present disclosure, the process of step 1407 is called the first phase. When step 1407 ends, the regular update 1304 performed at intervals of RTTs ends. The details of step 1407 of increasing the control bandwidth (token) will be described later with reference to FIG. 16.

FIG. 15 is a detailed flowchart of the irregular update process 1305 of the control bandwidth (token) performed by the transmission bandwidth control unit 715.

When it is determined in step 1303 of FIG. 13 that the current time is not a time in which the RTT has elapsed from the previous control bandwidth update process performed at intervals of RTTs in step 1304, in the irregular update process 1305 performed by the transmission bandwidth control unit 715, first it is determined whether he increase rate of the discarding rate (rts_ratio) has exceeded the threshold value k (step 1501). When the increase rate of the discarding rate (rts_ratio) has exceeded the threshold value k, the new control bandwidth is decided based on the retransmission bandwidth rts before 0 to RTT, the transmission bandwidth old_snd before RTT to 2 RTTs, or the control bandwidth old_token (step 1502). For example, the new control bandwidth token=the control bandwidth (before the reference time: before RTT to 2 RTTs) old_token−the retransmission bandwidth (after the reference time: before 0 to RTT) rts (step 1502). In the present disclosure, the process of step 1502 is called the second phase, similarly to step 1402. When step 1502 ends, the irregular update process 1305 ends. Meanwhile, when it is determined in step 1501 that the increase rate of the discarding rate (rts_ratio) has not exceeded the threshold value k, the control bandwidth (token) is updated using the control bandwidth (c_token) at the time of the most recent regular update (step 1503). For example, token=c_token (step 1503). In the present disclosure, the process of step 1503 is called the third phase.

As described above with reference to FIGS. 13 to 15, the control bandwidth (token) update process performed by the transmission bandwidth control unit 715 is roughly divided into four kinds of processes, that is, includes the first phase (step 1407) of increasing the bandwidth, the second phase (steps 1402 and 1502) of decreasing the bandwidth, the third phase (step 1503) of returning the bandwidth to the original value, and the fourth phase (step 1406) of maintaining the bandwidth constant according to the ACK reception number.

Figure 17:
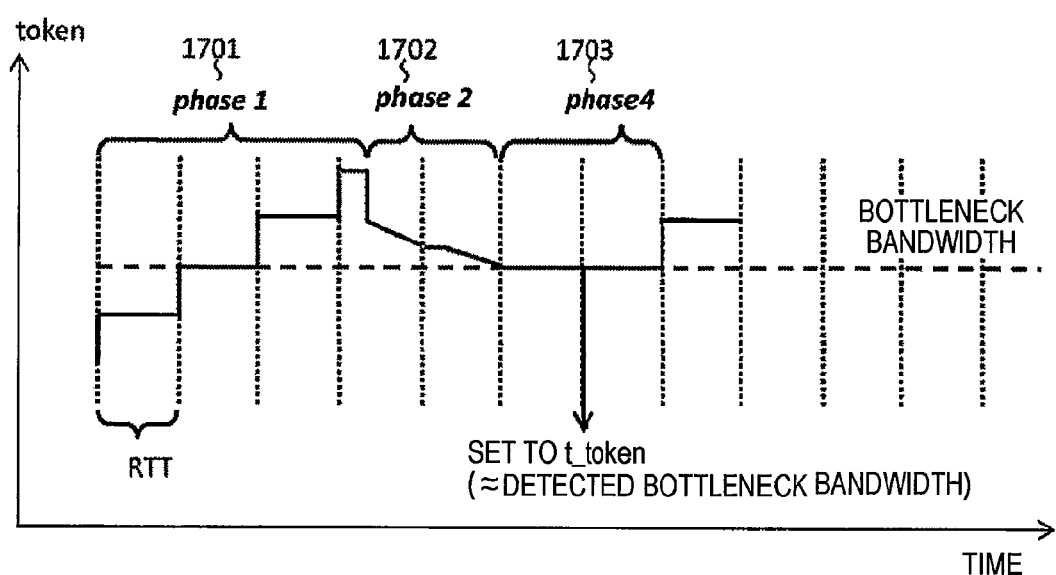
FIG. 17 is a conceptual diagram for describing four kinds of phases of a change in a control bandwidth.

FIG. 17 is a graph illustrating how the control bandwidth (token) chronologically changes through the control bandwidth (token) update process performed by the transmission bandwidth control unit 715.

First, there is the first phase (step 1407) in which the bandwidth is increased, then there is the second phase (steps 1402 and 1502) in which the bandwidth is decreased, and finally there is the fourth phase (step 1406) in which the bandwidth is maintained constant according to the ACK reception number. The third phase (step 1503) in which the bandwidth is returned to the original value corresponds to a period of time until the regular update performed at intervals of RTTs is performed and is a phase in which the control bandwidth (token) is maintained constant.

The transmission bandwidth control unit 715 updates the bandwidth increase start time inc_time 538 in the state table 212 with the current time at the time of the second phase and the fourth phase. Further, the t_token 535 in the state table 212 is updated with the current control bandwidth (token) at the time of the fourth phase. The t_token 535 corresponds to the bottleneck bandwidth detected in the original TCP.

Figure 16A:
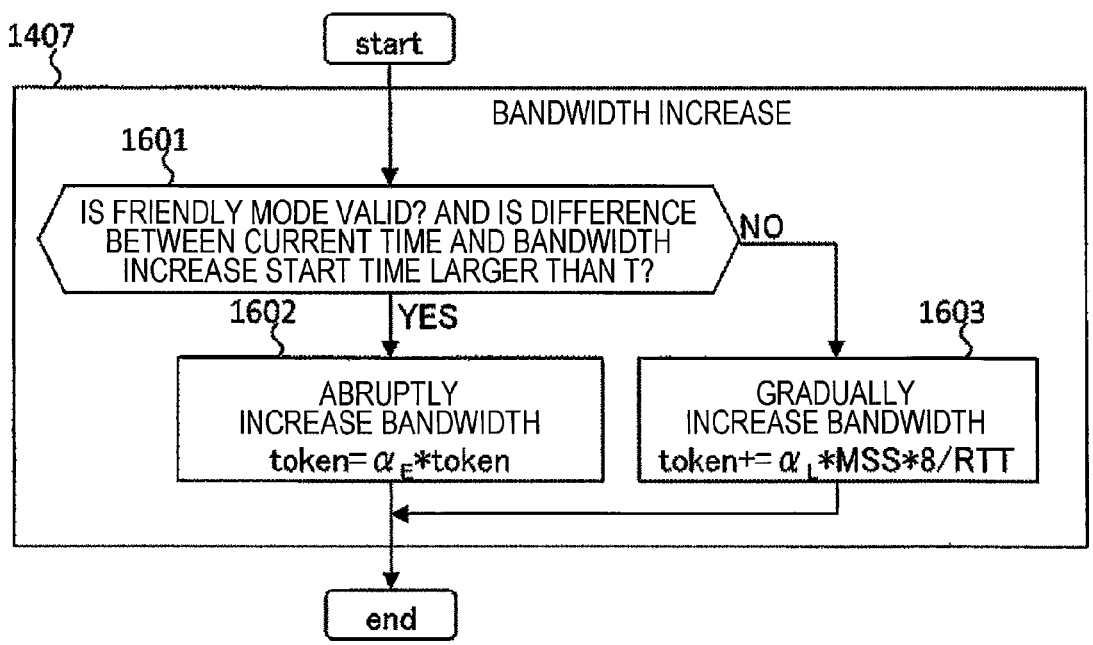
FIG. 16A is a flowchart A of a portion of increasing a control bandwidth.

FIG. 16A is a flowchart illustrating the bandwidth increase process of step 1407.

In the bandwidth increase process 1407 performed by the transmission bandwidth control unit 715, the value of the friendly_mode 532 described in the state table 212 is first checked, and it is determined whether communication in the friendly_mode on the normal TCP, that is, the first control mode is valid. Further, it is determined whether the difference between the current time and the bandwidth increase start time inc_time 538 has exceeded the period of time T (step 1601). When the friendly_mode friendly_mode 532 is valid and the difference between the current time and the bandwidth increase start time inc_time 538 has not exceeded the period of time T, the transmission bandwidth control unit 715 slowly increases the bandwidth in the first control mode (step 1603). For example, the new control bandwidth (token)=the original control bandwidth (token)+the coefficient $\alpha_L$×the maximum segment size MSS×8/RTT (step 1603). For example, the coefficient $\alpha_L$ is less than 1. When the friendly_mode friendly_mode 532 is invalid or the different between the current time and the bandwidth increase start time inc_time 538 has exceeded the period of time T, the transmission bandwidth control unit 715 abruptly increases the bandwidth in the second control mode that is higher in the increase rate of the transmission bandwidth that the first control mode (step 1602). For example, the new control bandwidth (token)=the coefficient $\alpha_E$×the original control bandwidth (token) (step 1602).

As described above, during the certain period of time T after congestion of a network is not detected (step 1401), for example, the increase rate of the discarding rate does not exceed the threshold value k, and the state in which the data segment whose reception has been acknowledged is being updated (step 1404) is continued, the transmission bandwidth is increased slowly, for example, linearly (step 1603), and thereafter, the transmission bandwidth is increased abruptly, for example, non-linearly (step 1602), and thus communication using the original TCP is prevented from occupying the line band, and communication using the normal TCP can secure the communication bandwidth.

Figure 16B:
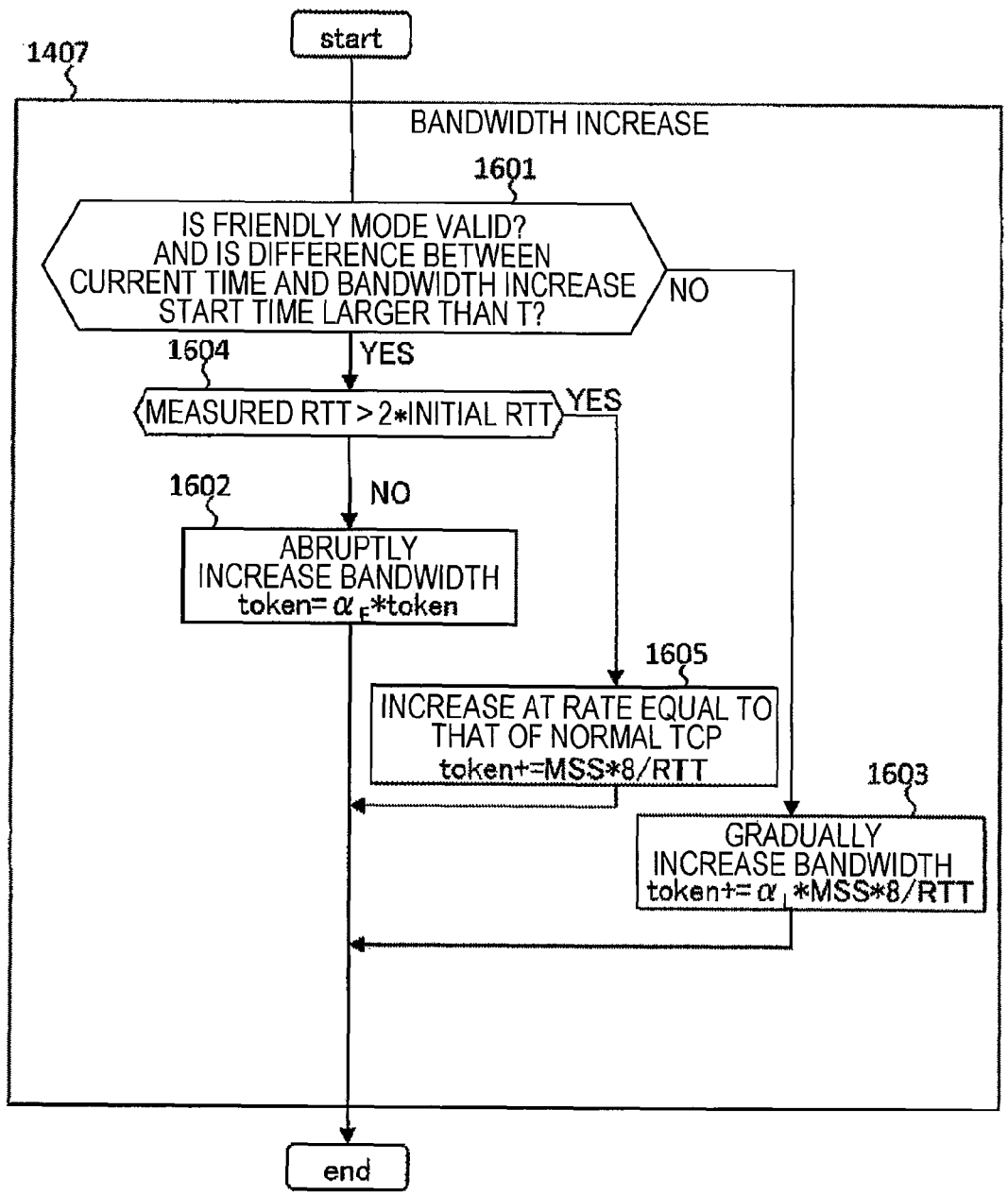
FIG. 16B is a flowchart B of a portion of increasing a control bandwidth.

FIG. 16B is another flowchart illustrating the bandwidth increase process of step 1407. FIG. 16B is an example in which one bifurcation process is added to FIG. 16A.

A bifurcation process (step 1604) is newly added between step 1601 and step 1602 described above with reference to FIG. 16A, and the flow in which the process (step 1605) different from step 1602 is performed is performed. The remaining process is similar to that of FIG. 16A.

When it is determined step 1601 that the friendly mode friendly_mode 532 is valid and the difference between the current time and the bandwidth increase start time inc_time 538 does not exceed the period of time T, it is determined whether the measured RTT has exceeded certain times (for example, twice) of the initial RTT (step 1604). When the measured RTT has not exceeded certain times of the initial RTT, the process of step 1602 is performed. When the measured RTT has exceeded certain times of the initial RTT, the transmission bandwidth control unit 715 increases the bandwidth at the same speed as in the normal TCP which is a third control mode (step 1605). For example, the new control bandwidth (token)=the original control bandwidth (token)+the maximum segment size MSS×8/RTT (step 1605). Thus, implemented is a communication device in which the increase rate is decided based on the ratio of the average RTT and the initial RTT, and the transmission bandwidth control is performed using the decided increase rate as the third control mode which is intermediate between the first control mode and the second control mode.

As described above, when the measured RTT has exceeded certain times (for example, twice) of the initial RTT, the process of causing the bandwidth increase rate to be equal to that in the normal TCP is performed. Even when congestion of a network is not detected, as the bandwidth increase rate is decreased from the early stage in which the RTT starts to increase, it is possible to prevent the excessive use of the line bandwidth and promote a fair use of the bandwidth.

Figure 16C:
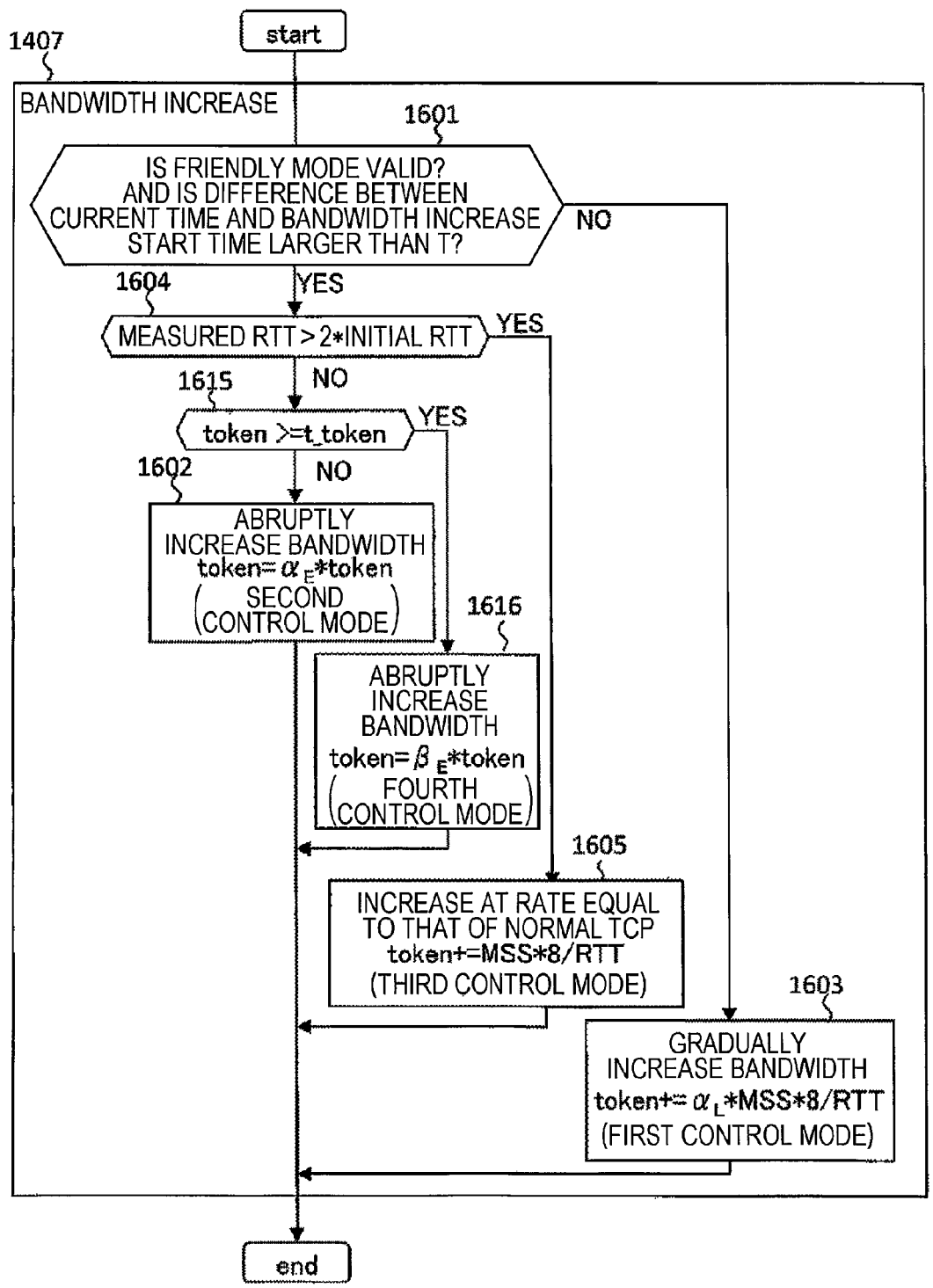
FIG. 16C is a flowchart C of a portion of increasing a control bandwidth.

FIG. 16C is another flowchart illustrating the bandwidth increase process of step 1407. FIG. 16C is an example in which one bifurcation process is added to FIG. 16B.

A bifurcation process (step 1615) is newly added between step 1604 and step 1602 described above with reference to FIG. 16B, and the flow in which the process (step 1616)

different from step 1602 is performed is performed. The remaining process is similar to that of FIG. 16B.

When it is determined in step 1604 that the measured RTT has not exceed certain times (for example, twice) of the initial RTT, it is determined whether the current control bandwidth (token) has exceeded the most recent control bandwidth t_token 535 that is in the state in which congestion is not detected (step 1615). When the current control bandwidth (token) has not exceeded the most recent bandwidth t_token 535 that is in the state in which congestion is not detected, the process of step 1602 (the second control mode) is performed. When the current control bandwidth (token) has exceeded the most recent bandwidth t_token 535 that is in the state in which congestion is not detected, the bandwidth is abruptly increased by a fourth control mode that is gentler than step 1602 (the second control mode) but more abrupt than the third control mode (step 1616). For example, the new control bandwidth (token)=a coefficient $\beta_E \times$ the original control bandwidth (token) (step 1616). Thus, implemented is a communication device in which the increase rate is decided based on the most recent transmission bandwidth that is in the state in which congestion is not detected.

As described above, when the current control bandwidth (token) has exceeded the most recent control bandwidth t_token 535 that is in the state in which congestion is not detected, the process of causing the bandwidth increase rate to be gentle is performed. Even when it is difficult to detect congestion of a network, as the bandwidth increase rate is decreased from the stage in which congestion of a network is likely to occur, it is possible to prevent the excessive use of the line bandwidth. Further, in transmission bandwidth control unit 150 of the communication device 101 or the transmission bandwidth control unit 715 of the communication device 200 corresponding to the communication device 101 of FIG. 1, the first to fourth control modes may be mounted, and one of the processes of FIGS. 16A to 16C may be performed. Further, among the first to fourth control modes, at least two or more kinds of control modes may be mounted or set in a communication device in an executable state. However, when the first control mode is not set in an executable state, the transmission bandwidth control unit 715 (150 of FIG. 1) may change the control mode to another control mode in the condition of FIG. 16 after a period of time in which a control mode that is low in the increase rate elapses by a certain period of time (for example, the difference between the current time and the bandwidth increase start time>T). Further, each control mode may be stored in a non-volatile storage medium of the communication device 200 as a program. Two or more control modes among the four kinds of control modes described above with reference to FIGS. 16A to 16C may be set to be executable in the communication device from the management terminal or the like. The transmission bandwidth control of increasing or decreasing the increase rate according to a certain condition is performed using the two or more control modes, and thus it is possible to fairly share the bandwidth with another communication. Further, the determination as to whether "the friendly_mode is valid" in step 1601 of FIGS. 16A to 16C may be omitted. The control mode of increasing the transmission bandwidth which is performed by the transmission bandwidth control unit 715 has been described above.

Second Embodiment (Process of Changing Communication Mode)

An example of changing the communication mode according to whether the counterpart device supports the original TCP when the communication device supporting the original TCP starts data communication will be described below, but a configuration is similar to that of the above-described embodiment except the communication device 100 of FIG. 1 or the communication device of FIG. 2 unless specially set forth otherwise.

The details of a method in which the TCP control unit 707/703 decides the communication mode (the friendly_mode friendly_mode 532 or the one way_mode one-way_mode 533) described in the state table 212 will be described with reference to a sequence diagram of FIG. 18, flowcharts of FIGS. 19 to 20, and a table format diagram of FIG. 23.

First, a format of the mode/minimum bandwidth designation table 740 will be described with reference to FIG. 23.

The mode/minimum bandwidth designation table 740 includes a plurality of entries each of which designates validity or invalidity of the friendly_mode and the minimum bandwidth for each combination of a transmission IP/sub network, a destination IP/sub network, a transmission port, and a destination port.

The user terminal 741 illustrated in FIG. 7A designates validity or invalidity of the friendly_mode and the minimum bandwidth for each combination of a transmission IP/sub network, a destination IP/sub network, a transmission port, and a destination port. Among the transmission IP/sub network, the destination IP/sub network, the transmission port, and the destination port, an item having an arbitrary value is designated, for example, as "Any." When it is desired to designate a default operation for an arbitrary combination, all of the transmission IP/sub network, the destination IP/sub network, the transmission port, and the destination port may be designated, for example, as "Any," and then the validity or invalidity of the friendly_mode and the minimum bandwidth may be designated. When it is desired to designate the validity or invalidity of the friendly_mode and the minimum bandwidth for communication in which a specific network is the destination, another transmission IP/sub network, another transmission port, and another destination port are designated, for example, as "Any," and then the destination IP/sub network, the validity or invalidity of the friendly mode, and the minimum bandwidth are designated. When it is desired to designate the validity or invalidity of the friendly_mode and the minimum bandwidth for communication of a specific transmission port number in which a specific network is the source, the destination IP/sub network and the destination port are designated, for example, as "Any," and then the transmission IP/sub network, the transmission port, the validity or invalidity of the friendly_mode, and the minimum bandwidth are designated.

When receiving an SYN packet or an SYN ACK packet and establishing a connection, the TCP control unit 707/703 searches for a matching entry from the mode/minimum bandwidth designation table 740, and writes a minimum bandwidth designated in the entry in a min_token 535 in the state table 212 when there is a matching entry. Further, the transmission bandwidth control unit 715 controls the control bandwidth (token) based on the min_token 535 in the state table 212 such that the control bandwidth (token) is lower than the min_token 535. As a result, it is possible to decide the minimum bandwidth of each TCP communication from the outside in advance.

FIG. 18A is a sequence diagram illustrating a process in which the communication device (supporting the original TCP) that autonomously starts communication decides the communication mode when the counterpart device supports the original TCP.

The communication device 1801 (supporting the original TCP) transmits an SYN packet 1803 having an original option number to a counterpart communication device 1802

(supporting the original TCP). Upon receiving the SYN packet 1803 having the original option number, the counterpart communication device 1802 (supporting the original TCP) transmits an SYN ACK packet 1804 having an original option number as a reply. Upon receiving the SYN ACK packet 1804 having the original option number from the counterpart communication device 1802 (supporting the original TCP), the communication device 1801 (supporting the original TCP) searches for a matching entry from the mode/minimum bandwidth designation table 740 using the transmission IP address 413, the destination IP address 414, the transmission port number 421, and the reception port number 422 which are described in the IP header 410 and the TCP header 420 of the SYN ACK packet 1804. When there is a matching entry in which the friendly_mode is valid, the friendly_mode 532 in the state table 212 is validated (1805).

FIG. 18B is a sequence diagram illustrating a process in which the communication device (supporting the original TCP) that autonomously starts communication decides the communication mode when the counterpart device does not support the original TCP.

The communication device 1801 (supporting the original TCP) transmits the SYN packet 1803 having the original option number to a counterpart device 1806 (not supporting the original TCP). Upon receiving the SYN packet 1803 having the original option number, the counterpart device 1806 (not supporting the original TCP) transmits an SYN ACK packet 1807 having no original option number as a reply. Upon receiving the SYN ACK packet 1807 having no original option number from the counterpart device 1806 (not supporting the original TCP), the communication device 1801 (supporting the original TCP) validates the one-way_mode 533 and the friendly mode 532 in the state table 212 (1808).

FIG. 18C is a sequence diagram illustrating a process in which the communication device (supporting the original TCP) that autonomously starts communication decides the communication mode when the counterpart device supports the original TCP.

Upon receiving an SYN packet 1809 having an original option number from the counterpart communication device 1802 (supporting the original TCP), the communication device 1801 (supporting the original TCP) transmits an SYN ACK packet 1810 having an original option number as a reply. Further, a matching entry is searched for from the mode/minimum bandwidth designation table 740 using the transmission IP address 413, the destination IP address 414, the transmission port number 421, and the reception port number 422 which are described in the IP header 410 and the TCP header 420 of the SYN packet 1809. When there is a matching entry in which the friendly mode is valid, the friendly_mode 532 in the state table 212 is validated (1811).

FIG. 18D is a sequence diagram illustrating a process in which the communication device (supporting the original TCP) that autonomously starts communication decides the communication mode when the counterpart device does not support the original TCP.

Upon receiving an SYN packet 1812 having no original option number from the counterpart device 1806 (not supporting the original TCP), the communication device 1801 (supporting the original TCP) transmits an SYN ACK packet 1813 having no original option number as a reply. Further, the one-way_mode 533 and the friendly mode 532 in the state table 212 are validated (1814).

The sequence diagram in which the communication mode is decided according to whether the counterpart device supports the original TCP has been described above. For example, the counterpart device not supporting the original TCP is a communication device such as the router 186 of FIG. 1 or the computer 131 or 123.

FIG. 19 is a flowchart illustrating a process in which a communication device that autonomously starts communication and corresponds to FIGS. 18A to 18D decides the communication mode.

When the communication device 1801 (supporting the original TCP) autonomously starts communication (step 1901), the TCP control unit 703 first transmits an SYN packet having a specific option number (step 1902). Then, upon receiving the SYN ACK packet from the counterpart device (step 1903), the TCP control unit 703/707 determines whether the SYN ACK packet has the specific option number (step 1904). When the SYN ACK packet has the specific option number, a matching entry is searched for from the mode/minimum bandwidth designation table 740 using the transmission IP address 413, the destination IP address 414, the transmission port number 421, and the reception port number 422 which are described in the IP header 410 and the TCP header 420 in the SYN ACK packet, and it is determined whether there is a matching entry in which the friendly mode is valid (step 1906). When there is no matching entry in which the friendly mode is valid, the TCP control unit 703/707 establishes communication as is (step 1908). When there is a matching entry in which the friendly mode is valid, the friendly mode 532 in the state table 212 is validated (step 1907). Further, when it is determined in step 1904 that the SYN ACK packet does not have the specific option number, the one-way_mode 533 in the state table 212 is validated (step 1905). Thereafter, the friendly mode may be forcibly validated (step 1907), and the validity/invalidity of the friendly mode 532 in the state table 212 may be decided based on a result of searching the mode/minimum bandwidth designation table 740 in step 1906. The friendly mode 532 or the one-way_mode 533 in the state table 212 is set to invalid as a default setting. Thus, a communication device in which TCP communication to which the transmission bandwidth increase method is applied is decided from the outside in advance is implemented.

FIG. 20 is a flowchart illustrating a process in which a device that passively starts communication decides the communication mode.

When the communication device 1801 (supporting the original TCP) passively starts communication (step 2001), an SYN packet is first received (step 2002), and communication starts (step 2003). Then, it is determined whether the SYN packet has a specific option number (step 2004). When the SYN packet has the specific option number, a matching entry is searched for from the mode/minimum bandwidth designation table 740 using the transmission IP address 413, the destination IP address 414, the transmission port number 421, and the reception port number 422 which are described in the IP header 410 and the TCP header 420 of the SYN packet, and it is determined whether there is a matching entry in which the friendly mode is valid (step 2006). When there is a matching entry in which the friendly mode is valid, the friendly mode 532 in the state table 212 is validated (step 2007). Further, when it is determined in step 2004 that the SYN packet has no specific option number, the one-way_mode 533 in the state table 212 is validated (step 2005). Thereafter, the friendly mode may be validated, and (step 2007), and the validity/invalidity of the friendly mode 532 in the state table 212 may be decided as a result of searching the mode/minimum bandwidth designation table 740 in step 2006. The friendly mode 532 or the one-way_mode 533 in the state table 212 may be set to invalid as a default setting. Then, when the communication mode is decided, it is determined whether the one-way_mode 533 is valid (step 2008). When the one-way_mode 533 is valid, the SYN ACK packet having the specific option number is transmitted to the counterpart device (step 2009). When the one-way_mode 533 is invalid, the SYN ACK packet having no option number is transmitted to the counterpart device (step 2010). When the SYN ACK packet is transmitted, communication is established (step 2011). Through this process, implemented is a communication device in which TCP communication to which the transmission bandwidth increase method is applied is decided from the outside in advance.

As the communication mode is decided using the table format of FIG. 23, the sequence illustrated in FIG. 18, and the flowcharts illustrated in FIGS. 19 and 20, the user can designate communication in the friendly mode for each connection from the outside in advance. Further, when the option information having the specific value is not transmitted from the counterpart device at the time of TCP communication, it is possible to forcibly apply the friendly mode.

(Method of Calculating Discarding Rate is Changed According to Communication Mode)

The details of the process in which the transmission bandwidth control unit 715 calculates the discarding rate according to the communication mode will be described below with reference to a flowchart of FIG. 21 and a sequence diagram of FIG. 22 according to the second embodiment.

FIG. 22 is a sequence diagram for describing a difference in a retransmission method between the original TCP and the normal TCP when packet discarding occurs. The left side illustrates a retransmission control scheme of the normal TCP, and the right side illustrates a retransmission control scheme of the original TCP.

In the normal TCP, a maximum of four segments representing a section in which partial reception has been performed are described in the left_edges_1 to 4 (433, 435, 437, and 439) and the right_edges_1 to 4 (434, 436, 438, and 440) in the TCP option header 430 of the ACK packet, and used for a partial acknowledgement response (selective ACK (SACK)). Meanwhile, in the original TCP, a maximum of four segments representing a section that is desired to be partially retransmitted are described in the left_edges_1 to 4 (433, 435, 437, and 439) and the right_edges_1 to 4 (434, 436, 438, and 440) of the TCP option header 430, and used for a partial negative acknowledgement response (negative ACK (NACK)).

In the normal TCP, when among 12 data packets A to L (2205) transmitted from a transmitting computer 2201 to a receiving computer 2202, the data packets B, D, F, H, and J are discarded in the middle, it is difficult to transmit the acknowledgement response on the packets transmitted after the data packet I to the transmitting computer 2201 at this point in time due to the restriction that a maximum of received four segments can be written in the TCP option header 430 (2209). The transmitting computer retransmits the packets B, D, F, and H discarded among the packets A to I using the acknowledge response packet (2209) describing the partial acknowledgement response of the packets A to I (2206). The receiving computer 2202 receives the retransmission packet (2206), and then transmits the acknowledgement response describing the partial acknowledgement response after the packet I (2212). The transmitting computer 2201 receives the acknowledgement response (2212) describing the partial acknowledgement response subsequent to the packet I, and can retransmits the packet J discarded after the packet I (2207). Meanwhile, in the original TCP, even when among 12 data packets A to L (2208) transmitted from a transmitting computer 2203 to a receiving computer 2204, the data packets B, D, F, H, and J are discarded in the middle, segments of A to J that are desired to be retransmitted are written in the left_edge_1 (433) and the right_edge_1 (434) of the TCP option header 430 in detail, and then the ACK packet for the partial negative acknowledgement response (NACK) is transmitted (2211). Each retransmission request segment is written in one NACK packet. Upon receiving the ACK packet (2211) for the partial negative acknowledgement response (NACK), the transmitting computer 2203 retransmits the retransmission request segment B, D, F, H, and J described in the TCP option header 430 (2210). Even when a lot of loss occurs, since retransmission is completed at one time, the communication period of time is reduced, and the bandwidth is improved. In other words, two communication relay devices (proxy devices) are arranged between the transmitting computer and the receiving computer, and the proxy device at the receiving computer side gives detailed feedback on the discarded segment to the proxy device at the transmitting computer side. For example, the proxy device at the transmitting computer side retransmits the discarded segment fed back from the proxy device at the receiving computer side, and the sum of the data transmission bandwidth and the data retransmission bandwidth on the specific destination is increased or decreased based on the retransmission bandwidth or the discarding bandwidth after the reference time and the transmission bandwidth before the reference time. As a result, communication that does not depend on the discarding rate can be implemented.

As described above, in the normal TCP, since the SACK is used, when the counterpart device corresponds to the normal TCP, it is necessary to use the SACK. Further, since a maximum of four discarded segments are notified, when the discarding rate is calculated using the retransmission bandwidth, an error is large when there are many discarded segments. For this reason, when the counterpart device corresponds to the normal TCP, it is necessary to change the discarding rate calculation method and control the transmission bandwidth.

FIG. 21 is a flowchart illustrating a process of changing the discarding rate calculation method according to the communication mode.

First, it is determined whether the one-way_mode 533 in the state table 212 is valid (step 2101). When the one-way_mode 533 is invalid, it means that the counterpart device corresponds to the original TCP, and thus the retransmission rate is calculated using the most recent retransmission number and the transmission number before the RTT or the most recent retransmission bandwidth its and the control bandwidth old_token before the RTT, and used as the discarding rate (step 2105). Meanwhile, when the one-way_mode 533 is valid, it is determined whether a duplicated ACK is being received (step 2102). When the duplicated ACK is not being received, the discarding rate is set to 0 (step 2103). When the duplicated ACK is being received, the discarding rate is calculated using the most recent ACK reception number and the transmission number before the RTT or the most recent reception bandwidth rcv and the control bandwidth old_token before the RTT (step 2104). Through this process, implemented is the communication device 200 that estimates the discarding rate using the history of the transmission bandwidth and the ACK reception number only when the option information having the specific value is not transmitted from the counterpart device and includes the transmission bandwidth control unit that performs the bandwidth control based on the estimation result.

As described above, when the option information having the specific value is not transmitted from the counterpart device at the time of TCP communication, that is, when the counterpart device corresponds to the original TCP, the communication device according to the present embodiment estimates the discarding rate using the history of the transmission bandwidth and the ACK reception number, and thus estimates the discarding rate without using the NACK. Through this process, it is possible to reduce an error of the discarding rate that is used for bandwidth control in the original TCP, and it is easy to estimate the bottleneck bandwidth.

The communication device corresponding to the original TCP according to the second embodiment may be a communication device having the configuration according to the first embodiment. Further, the communication device corresponding to the original TCP according to the second embodiment may be a communication device in which at least one of the first to fourth control modes of FIG. 16 is mounted. As described in the above embodiment, another aspect disclosed in the specification of the present application is as follows. A communication device that controls a transmission bandwidth of TCP communication includes a means for linearly increasing the transmission bandwidth of the TCP communication during a certain period of time after a data segment whose reception has been acknowledged enters an update state without detection of congestion in the TCP communication, a means for non-linearly increasing the transmission bandwidth after the certain period of time, a means for detecting congestion using a change rate of a discarding rate or a retransmission rate in the TCP communication, a means for estimating a retransmission rate and a change rate thereof using a previous history of the transmission bandwidth and a retransmission bandwidth, a means for estimating a discarding rate and a change rate thereof using a previous history of the transmission bandwidth and an ACK reception number, and a means of decreasing the transmission bandwidth using the previous history of the transmission bandwidth, the retransmission bandwidth, and the ACK reception number when congestion is detected.

According to the above aspect, even when communication using the normal TCP and communication using the original TCP share the same communication line, the communication using the original TCP is prevented from occupying the line bandwidth, and thus the communication using the normal TCP can secure the communication bandwidth.

Further, according to another aspect of the present invention, provided is a communication device that relays a plurality of TCP communications between a LAN side and a WAN side includes a bandwidth control unit that controls a transmission bandwidth of each TCP communication, a state table that records a history of a data segment whose reception has been acknowledged in each TCP communication, and a bandwidth table that records a previous history of a transmission bandwidth, a control bandwidth, a reception bandwidth, and a retransmission bandwidth in each TCP communication, wherein the bandwidth control unit determines the presence or absence of congestion of TCP communication and whether the data segment whose reception has been acknowledged is being updated based on the previous history of the transmission bandwidth, the control bandwidth, the reception bandwidth, and the retransmission bandwidth described in the bandwidth table and the history of the data segment whose reception has been acknowledged described in the state table, linearly increases the transmission bandwidth of the TCP communication during a certain period of time after the data segment whose reception has been acknowledged enter an update state without detection of congestion, and non-linearly increases the transmission bandwidth of the TCP communication after the certain period of time.

REFERENCE SIGNS LIST 101, 102 communication device
110, 120, 130 network
111, 121, 131 computer
190, 191, 192 line
200 communication device
715 transmission bandwidth control unit

The invention claimed is:

1. A first communication device connected to a network, comprising:
a transmission bandwidth control unit that manages a bandwidth related to a packet to be transmitted from the first communication device to a second communication device via the network for each interval, and when increasing a control bandwidth used to transmit a packet in an interval after a current interval based on a managed bandwidth in the current interval and a bandwidth in a previous interval, increases the control bandwidth at a first increase rate during a certain period of time, and increases the control bandwidth at a second increase rate higher than the first increase rate after the certain period of time; and
a transmitting unit that transmits a packet to the network according to the control bandwidth.

2. The communication device according to claim 1,
wherein when a discarding state of the transmitted packet does not satisfy a certain condition, the transmission bandwidth control unit linearly increases the control bandwidth until the certain period of time elapses, and non-linearly increases the control bandwidth after the certain period of time.

3. The communication device according to claim 2,
wherein the certain condition is whether a discarding rate reaches a certain threshold value, and
when the certain condition is not satisfied, it is determined that no congestion is detected, and when no congestion is detected, the transmission bandwidth control unit increases the control bandwidth according to reception of a notification including information representing a non-received segment among the transmitted packets and a reception acknowledgement response of the transmitted packets.

4. The communication device according to claim 1,
wherein congestion is detected based on a comparison result of a transmission bandwidth and a retransmission bandwidth between intervals.

5. The communication device according to claim 1,
wherein the transmission bandwidth control unit estimates a discarding rate or a retransmission rate and a change rate thereof using a previous history of a transmission bandwidth, a retransmission bandwidth, and a reception number of a reception acknowledgement response, and
when congestion is detected, the transmission bandwidth is decreased using the previous history of a transmission bandwidth, a retransmission bandwidth, and a reception number.

6. The communication device according to claim 1,
wherein the communication device transmits the packet according to TCP communication, and
the certain period of time is decided according to an RTT and the previous history of the transmission bandwidth in the TCP communication.

7. The communication device according to claim 1,
wherein the transmission bandwidth control unit decides an increase rate according to whether a maximum value of the transmission bandwidth is exceeded when no congestion is detected in an interval prior to a current point in time.

8. The communication device according to claim 1,
wherein the transmission bandwidth control unit exponentially increases the control bandwidth after the certain period of time.

9. The communication device according to claim 1,
wherein the communication device transmits the packet by TCP communication between the computers, and decides an increase rate based on a ratio of an average RTT and an initial RTT in the TCP communication.

10. The communication device according to claim 1,
wherein data transfer is relayed between the computers based on TCP communication, transmission bandwidth control by the transmission bandwidth control unit is applied to certain TCP communication among TCP communication in which the data transfer is performed, and the transmission bandwidth control is not applied to the other TCP communication.

11. The communication device according to claim 10,
wherein the transmission bandwidth control by the transmission bandwidth control unit is not applied to an UDP packet and an ARP packet relayed by the communication device.

12. The communication device according to claim 1,
wherein the transmitting unit transmits an establishment request packet for establishing communication for transmitting the packet, and decides whether bandwidth control by the transmission bandwidth control unit is applied to the packet based on a response packet received in response to the establishment request packet.

13. The communication device according to claim 12,
wherein the establishment request packet is transmitted when a TCP communication starts, and when the response packet does not include option information having a specific value from a counterpart device, the bandwidth control by the transmission bandwidth control unit is applied.

14. The communication device according to claim 13,
wherein only when the option information having the specific value is not transmitted from the counterpart device when the TCP communication starts, a discarding rate is estimated using a history of a transmission bandwidth and an ACK reception number.

15. A communication device that is connected to a first network connected to a plurality of computers and a second network that is a wide area network and relays a plurality of TCP communication, the communication device comprising:
a bandwidth control unit that controls a transmission bandwidth of each TCP communication;
a state table that records a history of a data segment whose reception has been acknowledged in each TCP communication; and
a bandwidth table that records a previous history of a transmission bandwidth, a control bandwidth, a reception bandwidth, and a retransmission bandwidth in each TCP communication,
wherein the bandwidth control unit determines the presence or absence of congestion of TCP communication and whether the data segment whose reception has been acknowledged is being updated based on the previous history of the transmission bandwidth, the control bandwidth, the reception bandwidth, and the retransmission bandwidth described in the bandwidth table and the history of the data segment whose reception has been acknowledged described in the state table, linearly increases the transmission bandwidth of the TCP communication during a certain period of time after the data segment whose reception has been acknowledged enter an update state without detection of congestion, and non-linearly increases the transmission bandwidth of the TCP communication after the certain period of time.

* * * * *